United States Patent
Takahashi et al.

(10) Patent No.: US 11,206,529 B2
(45) Date of Patent: Dec. 21, 2021

(54) USER APPARATUS FOR RETAINING CONTEXT INFORMATION

(71) Applicant: NTT DOCOMO, INC., Tokyo (JP)

(72) Inventors: Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/066,375

(22) PCT Filed: Jan. 6, 2017

(86) PCT No.: PCT/JP2017/000294
§ 371 (c)(1),
(2) Date: Jun. 27, 2018

(87) PCT Pub. No.: WO2017/119490
PCT Pub. Date: Jul. 13, 2017

(65) Prior Publication Data
US 2019/0020998 A1    Jan. 17, 2019

(30) Foreign Application Priority Data
Jan. 7, 2016    (JP) .............................. JP2016-002128

(51) Int. Cl.
*H04W 8/22*    (2009.01)
*H04W 92/12*    (2009.01)
(Continued)

(52) U.S. Cl.
CPC .............. *H04W 8/22* (2013.01); *H04W 4/70* (2018.02); *H04W 76/19* (2018.02); *H04W 76/20* (2018.02);
(Continued)

(58) Field of Classification Search
CPC ......... H04W 8/22; H04W 4/70; H04W 88/08; H04W 76/20; H04W 76/19; H04W 76/30; H04W 76/27; H04W 92/12
See application file for complete search history.

(56) References Cited

U.S. PATENT DOCUMENTS

| | | | |
|---|---|---|---|
| 2013/0010716 A1* | 1/2013 | Dinan | H04W 76/15 370/329 |
| 2013/0039232 A1* | 2/2013 | Kim | H04L 43/06 370/280 |

(Continued)

FOREIGN PATENT DOCUMENTS

| | | |
|---|---|---|
| CN | 103858512 A | 6/2014 |
| WO | 2015/060327 A1 | 4/2015 |

OTHER PUBLICATIONS

Written Opinion (English Translation) of the International Searching Authority issued in PCT/JP2017/000294, dated Mar. 28, 2017. (Year: 2017).*

(Continued)

*Primary Examiner* — Joshua Kading
(74) *Attorney, Agent, or Firm* — Osha Bergman Watanabe & Burton LLP

(57) ABSTRACT

A base station in a mobile communication system that supports a function to reuse context information retained in each of a user apparatus and the base station to establish a connection is disclosed including a deletion unit configured to delete predetermined information in the context information associated with the user apparatus when the user apparatus ends a connected state in a condition where the base station retains the context information associated with the user apparatus, and an acquisition unit configured to acquire the predetermined information from a communication control apparatus that retains the predetermined infor- (Continued)

mation in the mobile communication system when the user apparatus restarts the connected state.

1 Claim, 22 Drawing Sheets

(51) Int. Cl.
  *H04W 4/70* (2018.01)
  *H04W 76/27* (2018.01)
  *H04W 76/20* (2018.01)
  *H04W 76/19* (2018.01)
  *H04W 76/30* (2018.01)
  *H04W 88/08* (2009.01)

(52) U.S. Cl.
  CPC ........... *H04W 76/27* (2018.02); *H04W 76/30* (2018.02); *H04W 88/08* (2013.01); *H04W 92/12* (2013.01)

(56) References Cited

U.S. PATENT DOCUMENTS

| | | | |
|---|---|---|---|
| 2013/0039339 | A1 | 2/2013 | Rayavarapu et al. |
| 2013/0324114 | A1 | 12/2013 | Raghothaman et al. |
| 2015/0230233 | A1* | 8/2015 | Kobayashi .......... H04W 72/048 370/329 |
| 2016/0029275 | A1* | 1/2016 | Guo ........................ H04W 8/22 455/436 |
| 2016/0270084 | A1 | 9/2016 | Sasaki et al. |
| 2017/0019936 | A1* | 1/2017 | Ohseki ................ H04W 72/048 |
| 2018/0084564 | A1* | 3/2018 | Xu ......................... H04W 76/10 |
| 2018/0092085 | A1* | 3/2018 | Shaheen ............... H04W 36/14 |
| 2018/0324748 | A1* | 11/2018 | Nord ..................... H04W 68/02 |
| 2019/0044690 | A1* | 2/2019 | Yi ............................. H04L 5/14 |
| 2019/0110190 | A1* | 4/2019 | Van Lieshout ......... H04W 8/08 |
| 2020/0015297 | A1* | 1/2020 | Feng ..................... H04W 88/06 |

OTHER PUBLICATIONS

Extended European Search Report issued in counterpart European Patent Application No. 17736027.8, dated Oct. 24, 2018 (16 Pages).
3GPP TS 36.331 V13.0.0; "3rd Generation Partnership Project; Technical Specification Group Radio Access Network; Evolved Universal Terrestrial Radio Access (E-UTRA); Radio Resource Control (RRC); Protocol specification (Release 13)"; Dec. 2015 (507 Pages).
Extended European Search Report issued in counterpart European Patent Application No. 17736027.8, dated Jun. 19, 2018 (16 pages).
International Search Report issued in PCT/JP2017/000294 dated Mar. 28, 2017 (7 pages).
Written Opinion of the International Searching Authority issued in PCT/JP2017/000294 dated Mar. 28, 2017 (5 pages).
3GPP TS 36.413 V12.4.0; "3rd Generation Partnership Project; Technical Specification Group Radio Access Network; Evolved Universal Terrestrial Radio Access Network (E-UTRAN); S1 Application Protocol (S1AP) (Release 12)"; Dec. 2014 (300 pages).
Ericsson; "New WID proposal: Signalling Reduction for Idle-Active Transitions in LTE"; 3GPP TSG RAN Meeting #66, RP-142030; Maui, USA; Dec. 8-11, 2014 (6 pages).
3GPP TR 23.720 V1.1.0; "3rd Generation Partnership Project; Technical Specification Group Services and System Aspects; Architecture enhancements for Cellular Internet of Things (Release 13)"; Oct. 2015 (90 pages).
Ericsson; "Introduction of the UE Context Resume function"; 3GPP TSG-RAN WG3 Meeting #90, R3-152688; Anaheim, CA, U.S.; Nov. 16-20, 2015 (17 pages).
3GPP TS 36.331 V12.6.0; "3rd Generation Partnership Project; Technical Specification Group Radio Access Network; Evolved Universal Terrestrial Radio Access (E-UTRA); Radio Resource Control (RRC) Protocol specification (Release 12)"; Jun. 2015 (448 pages).
NTT DOCOMO, Inc.; "UE capability design for NB-IoT UEs"; 3GPP TSG-RAN WG2 NB-IoT Ad-hoc Meeting, R2-160499; Budapest, Hungary; Jan. 19-21, 2016 (5 pages).
3GPP TS 36.300 V12.7.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Sep. 2015 (254 pages).
3GPP TS 23.401 V12.10.0; "3rd Generation Partnership Project; Technical Specification Group Services and System Aspects; General Packet Radio Service (GPRS) enhancements for Evolved Universal Terrestrial Radio Access Network (E-UTRAN) access (Release 12)"; Sep. 2015 (310 pages).
Office Action issued in counterpart European Patent Application No. 17736027.8, dated Jun. 26, 2019 (6 Pages).
NTT DOCOMO, Inc.; "NB-IoT UE capability profile"; 3GPP TSG-RAN2#92, R2-156426; Nov. 16-20, 2015, Anaheim, USA (5 Pages).
Office Action issued in the counterpart Chinese Patent Application No. 201780003852.8, dated Jan. 7, 2021 (19 pages).

\* cited by examiner

FIG.9

9.1.4.x5 UE CONTEXT RESUME REQUEST

This message is sent by the eNB to request the MME to indicate that the suspended RRC connection has been resumed.

Direction: eNB → MME

| IE/Group Name | Presence | Range | IE type and reference | Semantics description | Criticality | Assigned Criticality |
|---|---|---|---|---|---|---|
| Message Type | M | – | 9.2.1.1 | – | YES | reject |
| MME UE S1AP ID | M | – | 9.2.3.3 | – | YES | ignore |
| eNB UE S1AP ID | M | – | 9.2.3.4 | – | YES | ignore |
| S-TMSI | O | | 9.2.3.6 | | YES | reject |

FIG.10

9.1.4.x6    UE CONTEXT RESUME RESPONSE
This message is sent by the MME to indicate to the eNB the UE context and the related bearer contexts have been resumed.
Direction: MME → eNB

| IE/Group Name | Presence | Range | IE type and reference | Semantics description | Criticality | Assigned Criticality |
|---|---|---|---|---|---|---|
| Message Type | M | – | 9.2.1.1 | – | YES | reject |
| MME UE S1AP ID | M | – | 9.2.3.3 | – | YES | ignore |
| eNB UE S1AP ID | M | – | 9.2.3.4 | | YES | ignore |
| UE Radio Capability | O | | 9.2.1.27 | | YES | ignore |

FIG.11

9.1.4.x3  UE CONTEXT SUSPEND REQUEST
This message is sent by the eNB to request the MME to suspend the UE context and the related bearer contexts.
Direction: eNB → MME

| IE/Group Name | Presence | Range | IE type and reference | Semantics description | Criticality | Assigned Criticality |
|---|---|---|---|---|---|---|
| Message Type | M | – | 9.2.1.1 | – | YES | reject |
| MME UE S1AP ID | M | – | 9.2.3.3 | – | YES | ignore |
| eNB UE S1AP ID | M | – | 9.2.3.4 | – | YES | ignore |
| UE Radio Capability | O | | 9.2.1.27 | | YES | ignore |

FIG.12

9.1.4.x4  UE CONTEXT SUSPEND RESPONSE

This message is sent by the MME to indicate to the eNB the UE context and the related bearer contexts have been suspended.

Direction: MME → eNB

| IE/Group Name | Presence | Range | IE type and reference | Semantics description | Criticality | Assigned Criticality |
|---|---|---|---|---|---|---|
| Message Type | M | – | 9.2.1.1 | – | YES | reject |
| MME UE S1AP ID | M | – | 9.2.3.3 | – | YES | ignore |
| eNB UE S1AP ID | M | – | 9.2.3.4 | – | YES | ignore |

FIG.16A

```
UE-CapabilityRAT-ContainerList information element

-- ASN1START

UE-CapabilityRAT-ContainerList ::=SEQUENCE (SIZE (0..maxRAT-Capabilities)) OF UE-CapabilityRAT-
Container UE-CapabilityRAT-Container ::= SEQUENCE {
    rat-Type                       RAT-Type,
    ueCapabilityRAT-Container      OCTET STRING
}

-- ASN1STOP
```

FIG.16B

UECapabilityRAT-ContainerList field descriptions

*ueCapabilityRAT-Container*
Container for the UE capabilities of the indicated RAT. The encoding is defined in the specification of each RAT:
For E-UTRA: the encoding of UE capabilities is defined in IE *UE-EUTRA-Capability* or *UE-EUTRA-Capability-BL* for a BL UE.
For UTRA: the octet string contains the INTER RAT HANDOVER INFO message defined in TS 25.331 [19].
For GERAN CS: the octet string contains the concatenated string of the Mobile Station Classmark 2 and Mobile Station Classmark 3. The first 5 octets correspond to Mobile Station Classmark 2 and the following octets correspond to Mobile Station Classmark 3. The Mobile Station Classmark 2 is formatted as 'TLV' and is coded in the same way as the *Mobile Station Classmark 2* information element in TS 24.008 [49]. The first octet is the *Mobile station classmark 2 IEI* and its value shall be set to 33H. The second octet is the *Length of mobile station classmark 2* and its value shall be set to 3. The octet 3 contains the first octet of the value part of the *Mobile Station Classmark 2* information element, the octet 4 contains the second octet of the value part of the *Mobile Station Classmark 2* information element and so on. For each of these octets, the first/ leftmost/ most significant bit of the octet contains b8 of the corresponding octet of the Mobile Station Classmark 2. The Mobile Station Classmark 3 is formatted as 'V' and is coded in the same way as the value part in the *Mobile station classmark 3* information element in TS 24.008 [49]. The sixth octet of this octet string contains octet 1 of the value part of *Mobile station classmark 3*, the seventh of octet of this octet string contains octet 2 of the value part of *Mobile station classmark 3* and so on. Note.
For GERAN PS: the encoding of UE capabilities is formatted as 'V' and is coded in the same way as the value part in the *MS Radio Access Capability* information element in TS 24.008 [49].
For CDMA2000-1XRTT: the octet string contains the A21 Mobile Subscription Information and the encoding of this is defined in A.S0008 [33]. The A21 Mobile Subscription Information contains the supported CDMA2000 1xRTT band class and band sub-class information.

NOTE: The value part is specified by means of CSN.1, which encoding results in a bit string, to which final padding may be appended up to the next octet boundary TS 24.008 [49]. The first/ leftmost bit of the CSN.1 bit string is placed in the first/ leftmost/ most significant bit of the first octet. This continues until the last bit of the CSN.1 bit string, which is placed in the last/ rightmost/ least significant bit of the last octet.

FIG.17

– UE-EUTRA-Capability-BL

The IE UE-EUTRA-Capability-BL is used for a bandwidth reduced low complexity (BL) UE to convey the E-UTRA UE Radio Access Capability Parameters, see TS 36.306 [5]. The IE UE-EUTRA-Capability-BL is transferred in E-UTRA or in another RAT.

*UE-EUTRA-Capability-BL* information element

```
-- ASN1START

UE-EUTRA-Capability-BL-r13 ::=        SEQUENCE {
    accessStratumRelease-r13              AccessStratumRelease,
    ue-Category-r13                       ENUMERATED {m1, m2, spare2, spare1},
    pdcp-Parameters-r13                   PDCP-Parameters-r13                           OPTIONAL,
    phyLayerParameters-r13                PhyLayerParameters                            OPTIONAL,
    rf-Parameters-13                      RF-Parameters-13,
    interRAT-Parameters-r13               SEQUENCE {
        utraFDD                               IRAT-ParametersUTRA-FDD                       OPTIONAL,
        utraTDD128                            IRAT-ParametersUTRA-TDD128                    OPTIONAL,
        utraTDD384                            IRAT-ParametersUTRA-TDD384                    OPTIONAL,
        utraTDD768                            IRAT-ParametersUTRA-TDD768                    OPTIONAL,
        geran                                 IRAT-ParametersGERAN                          OPTIONAL,
        cdma2000-HRPD                         IRAT-ParametersCDMA2000-HRPD                  OPTIONAL,
        cdma2000-1xRTT                        IRAT-ParametersCDMA2000-1XRTT                 OPTIONAL
    }                                                                                   OPTIONAL,
    additionalSupportedFGIs-r13           SEQUENCE (size (1..maxFGIs-r13)) OF SupportedFGIs-r13,
    nonCriticalExtension          SEQUENCE {}                                           OPTIONAL
}

RF-Parameters-13 ::=                  SEQUENCE {
    supportedBandListEUTRA-13             SupportedBandListEUTRA-13
}

SupportedBandListEUTRA-13 ::=         SEQUENCE (SIZE (1..maxBands)) OF SupportedBandEUTRA-13

SupportedBandEUTRA-r13 ::=            SEQUENCE {
    bandEUTRA-r13                         FreqBandIndicator-r13,
    FullDuplex-r13                        ENUMERATED {supported}                        OPTIONAL,
    GaplessMeas-r13                       ENUMERATED {supported}                        OPTIONAL
}

SupportedFGIs-r13 ::= INTEGER (1..132)

-- ASN1STOP
```

| *UE-EUTRA-Capability* field descriptions | FDD/ TDD diff |
|---|---|
| accessStratumRelease <br> Set to rel13 in this version of the specification. | – |

FIG.18

Annex X (normative):
Supported FGIs for a bandwidth reduced low complexity UE

Table X-1: Rel-8/9 FGIs supported for a bandwidth reduced low complexity UE

| Index of indicator | Category M1 | | Category M2 | |
|---|---|---|---|---|
| | FDD | TDD | FDD | TDD |
| 1 | No | No | No | No |
| 2 | No | No | No | No |
| 3 | Yes | Yes | No | No |
| 4 | Yes | Yes | No | No |
| 5 | Yes | Yes | No | No |
| 6 | No | No | No | No |
| 7 | No | No | No | No |
| 8 | Yes | Yes | Yes | Yes |
| ... | ... | ... | ... | ... |

Table X-2: Rel-10 FGIs supported for a bandwidth reduced low complexity UE

| Index of indicator | Category M1 | | Category M2 | |
|---|---|---|---|---|
| | FDD | TDD | FDD | TDD |
| 101 | No | No | No | No |
| 102 | No | No | No | No |
| 103 | Yes | Yes | No | No |
| 104 | Yes | Yes | No | No |
| 105 | Yes | Yes | No | No |
| 106 | No | No | No | No |
| 107 | No | No | No | No |
| 108 | Yes | Yes | Yes | Yes |
| ... | ... | ... | ... | ... |

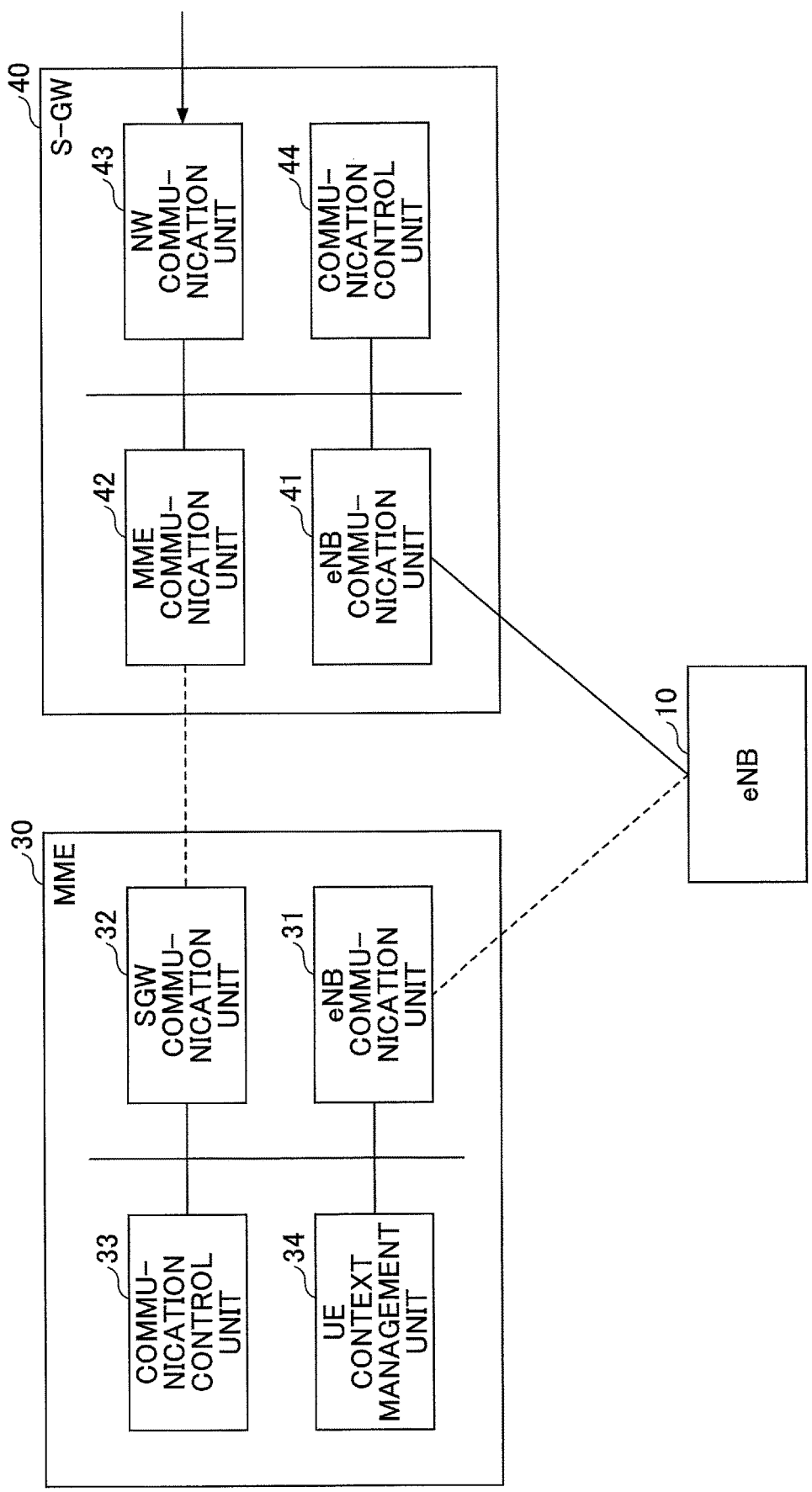

USER APPARATUS FOR RETAINING CONTEXT INFORMATION

CROSS REFERENCE TO RELATED APPLICATIONS

The present patent application is a national phase application of PCT/JP2017/000294 filed on Jan. 6, 2017 which claims priority to Japanese patent application No. 2016-002128, filed on Jan. 7, 2016. The contents of these applications are incorporated by reference in their entirety.

FIELD OF THE INVENTION

The present invention relates to a technology for enabling each of a user apparatus User Equipment (UE) and a base station eNB in a mobile communication system to retain a UE context.

BACKGROUND

In an Long-Term Evolution (LTE) system, there are two states representing a connection status between a user apparatus UE (hereinafter referred to as "UE") and a base station eNB (hereinafter referred to as "eNB"). Those two states are a Radio Resource Control (RRC) idle state (RRC_Idle) and an RRC connected state (RRC_Connected).

A UE context is generated at the time at which a UE connects to the network, and the UE context is retained in the eNB connected to the UE and in the UE. The UE context indicates information including bearer related information, security related information, and the like.

When the UE transits between the RRC idle state and the RRC connected state, a large number of call control signaling occurs including call control signaling occurring on a core Network (NW). Hence, an attempt has been made to reduce the amount of signaling.

For example, signaling such as that illustrated in FIG. 1 occurs (Non-Patent Document 1, etc.) when the UE is made to transition from the RRC connected state to the RRC idle state. FIG. 1 illustrates a case where an eNB 2 detects that a UE 1 has not performed communications for a predetermined time, and disconnects the connection from the UE 1 so that the UE1 transitions from the RRC connected state to the RRC idle state.

In FIG. 1, the eNB 2 transmits a UE Context Release Request to a Mobility Management Entity (MME) 3 (step S1). The MME 3 transmits a Release Access Bearers Request to a Serving Gateway (S-GW) 4 (step S2), and the S-GW 4 returns a Release Access Bearers Response to the MME 3 (step S3).

The MME 3 transmits a UE Context Release Command to the eNB 2 (step S4). The eNB 2 transmits an RRC Connection Release to the UE 1 (step S5), causing the UE 1 to release the UE context, and makes the UE 1 transition to the RRC idle state. In addition, the eNB 2 releases the UE context and transmits a UE Context Release Complete to the MME 3 (step S6).

RELATED-ART DOCUMENTS

Non-Patent Documents

[NON-PATENT DOCUMENT 1] 3GPP TS 36.413 V12.4.0 (2014-12)
[NON-PATENT DOCUMENT 2] 3GPP TSG RAN Meeting #66 RP-142030 Maui, USA, 8-11 Dec. 2014
[NON-PATENT DOCUMENT 3] 3GPP TR 23.720 V1.1.0 (2015-10)
[NON-PATENT DOCUMENT 4] 3GPP TSG-RAN WG3 Meeting #90 R3-152688 Anaheim, Calif., U.S., 16-20 Nov. 2015
[NON-PATENT DOCUMENT 5] 3GPP TS 36.331 V12.6.0 (2015-06)

SUMMARY

In accordance with one or more embodiments of the present invention, a base station in a mobile communication system that supports a function to reuse context information retained in each of a user apparatus and the base station to establish a connection is disclosed. The base station includes a deletion unit configured to delete a predetermined information in the context information associated with the user apparatus when the user apparatus ends a connected state in a condition where the base station retains the context information associated with the user apparatus and an acquisition unit configured to acquire the predetermined information from a communication control device that retains the predetermined information in the mobile communication system when the user apparatus resumes the connected state.

In some aspects, the acquisition unit transmits a signal indicating resuming of the connected state to the communication control device and receives a response signal including the predetermined information from the communication control device.

In some aspects, the signal indicating resuming of the connected state includes an identifier of the user apparatus, and the communication control device extracts the predetermined information based on the identifier of the user apparatus.

In some aspects, a transmitter that transmits the predetermined information to the communication control device when the user apparatus ends the connected state.

In some aspects, the predetermined information is capability information of the user apparatus.

In some aspects, when the capability information has a reduced size, the deletion unit does not delete the capability information, and the acquisition unit does not acquire the capability information.

In some aspects, the reduced capability information does not include information on capabilities provided by default in the user apparatus.

In accordance with one or more embodiments of the present invention, a context information retaining method executed by a base station in a mobile communication system that supports a function to reuse context information retained in each of a user apparatus and the base station to establish a connection is disclosed. The context information retaining method includes deleting predetermined information in the context information associated with the user apparatus when the user apparatus ends a connected state in a condition where the base station retains the context information associated with the user apparatus and acquiring the predetermined information from a communication control device that retains the predetermined information in the mobile communication system when the user apparatus resumes the connected state.

In accordance with one or more embodiments of the present invention, a context information retaining method executed by a communication control device and a base station in a mobile communication system that supports a function to reuse context information retained in each of a user apparatus and the base station to establish a connection is disclosed. The context information retaining method includes that the base station deletes predetermined information in the context information associated with the user apparatus when the user apparatus ends a connected state in a condition where the base station retains the context information associated with the user apparatus. The base station transmits a signal indicating resuming of the connected state to the communication control device when the user apparatus resumes the connected state. The communication control device receives the signal indicating resuming of the connected state and transmitting, by the communication control device, a response signal including the predetermined information to the base station.

In accordance with one or more embodiments of the present invention, a user apparatus in a mobile communication system including a base station and a user apparatus for Narrow Band Internet of Things (NB-IoT) is disclosed. The mobile communication system includes a receiver that receives a UE capability request from the base station, and a transmitter that transmits, to the base station, UE capability information of the user apparatus according to reception of the UE capability request. The UE capability information includes a UE category for NB-IOT, but does not include a parameter of Feature Group Indicators (FGI) and a parameter of a measurement gap.

BRIEF DESCRIPTION OF THE DRAWINGS

FIG. 9 is a diagram illustrating one or more embodiments of a UE context resume request message;

FIG. 10 is a diagram illustrating one or more embodiments of a UE context resume response message;

FIG. 11 is a diagram illustrating one or more embodiments of a UE context suspend request message;

FIG. 12 is a diagram illustrating one or more embodiments of a UE context suspend response message;

FIG. 16A is a diagram illustrating one or more embodiments of a modified specification example relating to UE capability;

FIG. 16B is a diagram illustrating one or more embodiments of a modified specification example relating to UE capability;

FIG. 17 is a diagram illustrating one or more embodiments of a modified specification example relating to UE capability;

FIG. 18 is a diagram illustrating one or more embodiments of a modified specification example relating to UE capability;

FIG. 19 includes configuration diagrams of one or more embodiments of a MME and an S-GW;

DETAILED DESCRIPTION

Figure 1:
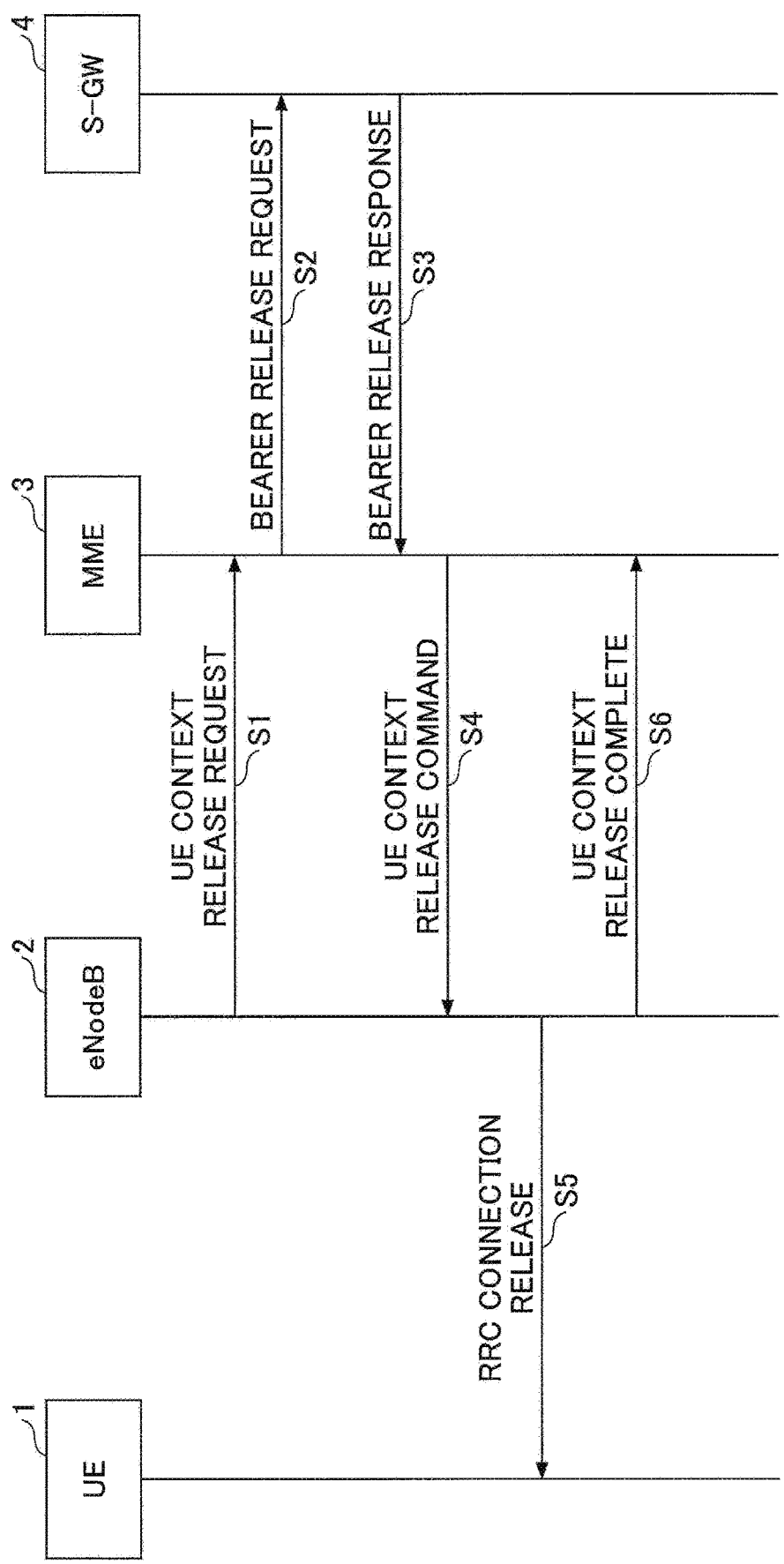
FIG. 1 is a diagram illustrating an example of a signaling sequence in a case where a UE transitions to an RRC idle state.

In the signaling process as illustrated in FIG. 1, a large amount of signaling times occurs when the RRC connection is released. In addition, a large amount of signaling times also occurs for setting the UE context when the UE transitions from the RRC idle state back to the RRC connected state again.

In order to reduce the signaling when the UE transitions between the RRC idle state and the RRC connected state, a method has been studied to reuse the UE context that has been retained in the eNB and in the UE when the UE transitions in the sequential order of RRC connected state, to RRC idle state, and to RRC connected state within the same eNB (Non-Patent Document 2). The following illustrates, with reference to FIG. 2, an example of a potential process of such a technology.

Figure 2:
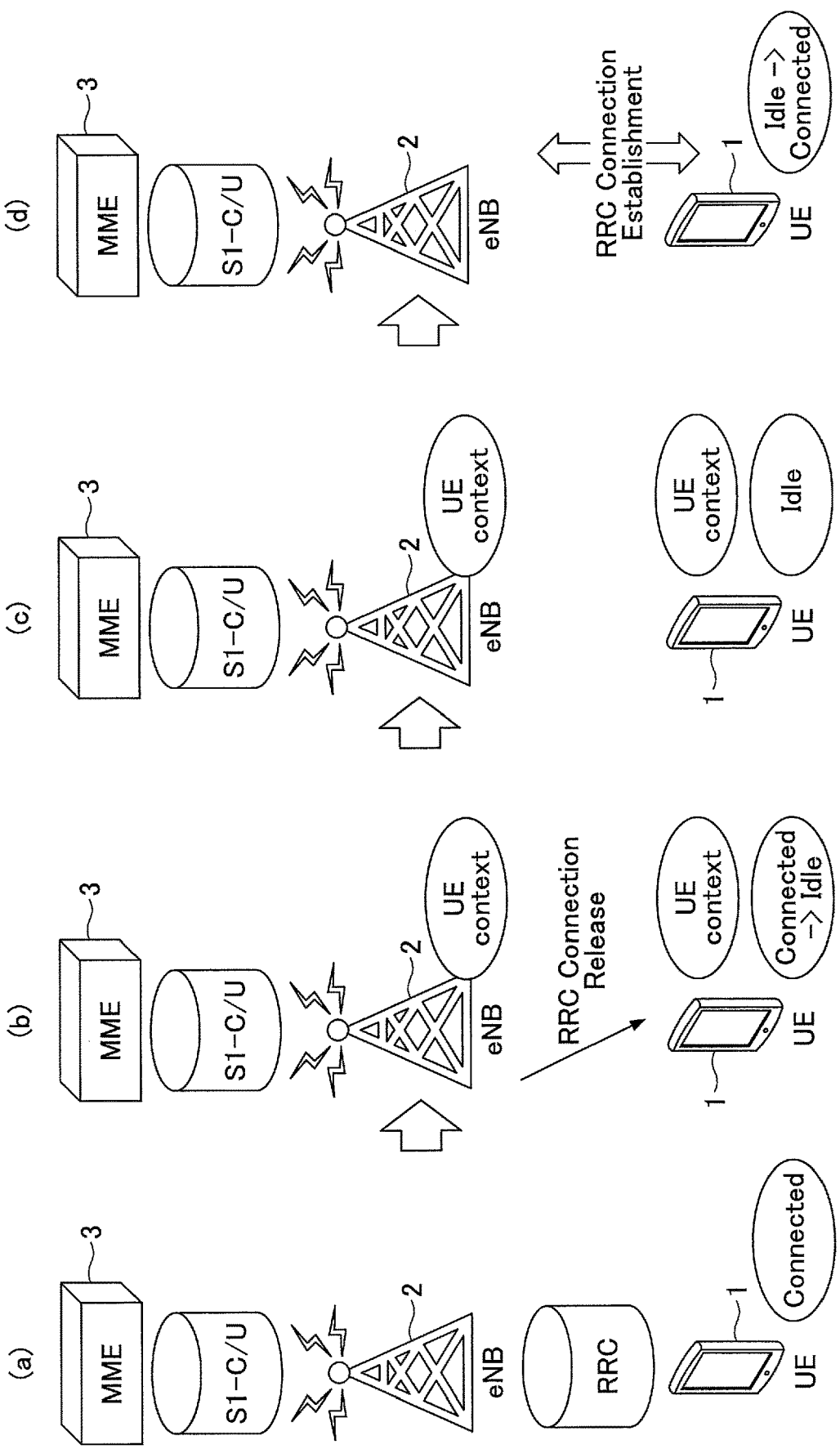
FIG. 2 includes diagrams illustrating a process example in a case of retaining a UE context.

In FIG. 2, (a) depicts an example in which the UE 1 is in an RRC connected state indicating that the connection of S1-C related to the UE 1 and the connection of S1-U (S1-C/U in FIG. 2(*a*)) have been established on the core NW. Note that the connection of S1-C is an S1 connection for transmitting a C-plane signal and the connection of S1-U is an S1 connection for passing through a U-plane.

As illustrated in (b) and (c) of FIG. 2, the UE 1 transitions from the RRC connected state illustrated in (a) of FIG. 2 to the RRC idle state by the RRC Connection Release. In this case, the UE context for the UE 1 in the eNB 2 remains retained, the UE context for the eNB 2 in the UE 1 also remains retained, and the S1-C/U connection to the UE 1 also remains maintained. As illustrated in (d) of FIG. 2, when the UE 1 transitions to the RRC connected state, the eNB 2 and the UE 1 reuse the retained UE context, thereby reducing the number of signaling times to establish the RRC connection.

In the configuration illustrated in FIG. 2, the eNB 2 needs to acquire UE capability (capability information of the UE 1) in order to perform data transmission/reception with the UE 1 that is in the RRC connected state. The UE capability is information that is assumed to be included in a UE context. Hence, the UE capability may be included in the UE context retained by the eNB 2 when the UE 1 is in the RRC idle state, as illustrated in (c) of FIG. 2.

However, the size of the UE capability is generally as large as several hundred bits. Hence, when an attempt has been made to save UE capabilities of such a large number of UEs in the eNB 2, the eNB 2 needs to secure a large memory capacity, which may lead to an increase in cost of the eNB 2.

The above-described problem is not limited to UE capability and may also arise in other cases of retaining large size information as UE context.

The disclosed technology is made in view of the above, and embodiments of the present invention provide a technology capable of reducing a size of context information retained by a base station in a mobile communication system that supports a function to reuse context information retained in each of a user apparatus and the base station to establish a connection between the user apparatus and the base station.

In accordance with an embodiment, a base station in a mobile communication system that supports a function to reuse context information retained in each of a user apparatus and the base station to establish a connection between the user apparatus and the base station, the base station includes a deletion unit configured to delete predetermined information in the context information associated with the user apparatus when the user apparatus ends a connected state in a condition where the base station retains the context information associated with the user apparatus; and an acquisition unit configured to acquire the predetermined information from a communication control device that retains the predetermined information in the mobile communication system when the user apparatus resumes the connected state.

In accordance with an embodiment, a context information retaining method executed by a base station in a mobile communication system that supports a function to reuse context information retained in each of a user apparatus and the base station to establish a connection, the context information retaining method includes deleting predetermined information in the context information associated with the user apparatus when the user apparatus ends a connected state in a condition where the base station retains the context information associated with the user apparatus; and acquiring the predetermined information from a communication control device that retains the predetermined information in the mobile communication system when the user apparatus restarts the connected state.

In accordance with an embodiment, a context information retaining method executed by a communication control device and a base station in a mobile communication system that supports a function to reuse context information retained in each of a user apparatus and the base station to establish a connection, the context information retaining method includes deleting, by the base station, predetermined information in the context information associated with the user apparatus when the user apparatus ends a connected state in a condition where the base station retains the context information associated with the user apparatus; transmitting, by the base station, a signal indicating resuming of the connected state to the communication control device when the user apparatus resumes the connected state; and receiving, by the communication control device, the signal and transmitting a response signal including the predetermined information to the base station.

According to embodiments of the present invention, it is possible to provide a technology capable of reducing a size of context information retained by a base station in a mobile communication system that supports a function to reuse context information retained in each of a user apparatus and the base station to establish a connection between the user apparatus and the base station.

The following describes embodiments of the present invention with reference to the accompanying drawings. Note that the embodiments described below are merely examples and the embodiments to which the present invention is applied are not limited to the following embodiments. For example, although the present embodiments are directed to a LTE system, the present invention is not restricted to the LTE system and is applicable to any system. For example, the present embodiments are applicable to Fifth Generation (5G). Further, in the present specification and the claims, unless otherwise specified, the term "LTE" is not restricted to a specific release (Rel) of 3 GPP.

In one or more embodiments, the UE deletes the UE capability from the UE context retained in the eNB when the UE has become in a suspended/idle state, and acquires the UE capability from an Mobility Management Entity (MME) when resuming the connection. However, the UE capability serving as information subject to reduction is merely an example. For example, information of RadioResourceConfigDedicated may be subject to reduction, instead of UE capability, or in addition to UE capability. That is, information of RadioResourceConfigDedicated may be deleted from the UE context retained in the eNB when the UE has become in the suspended/idle state, and information of RadioResourceConfigDedicated may be acquired from MME when the UE restarts the connection. Moreover, information other than the RadioResourceConfigDedicated may be subject to reduction.

(Overall Configuration of System)

Figure 3:
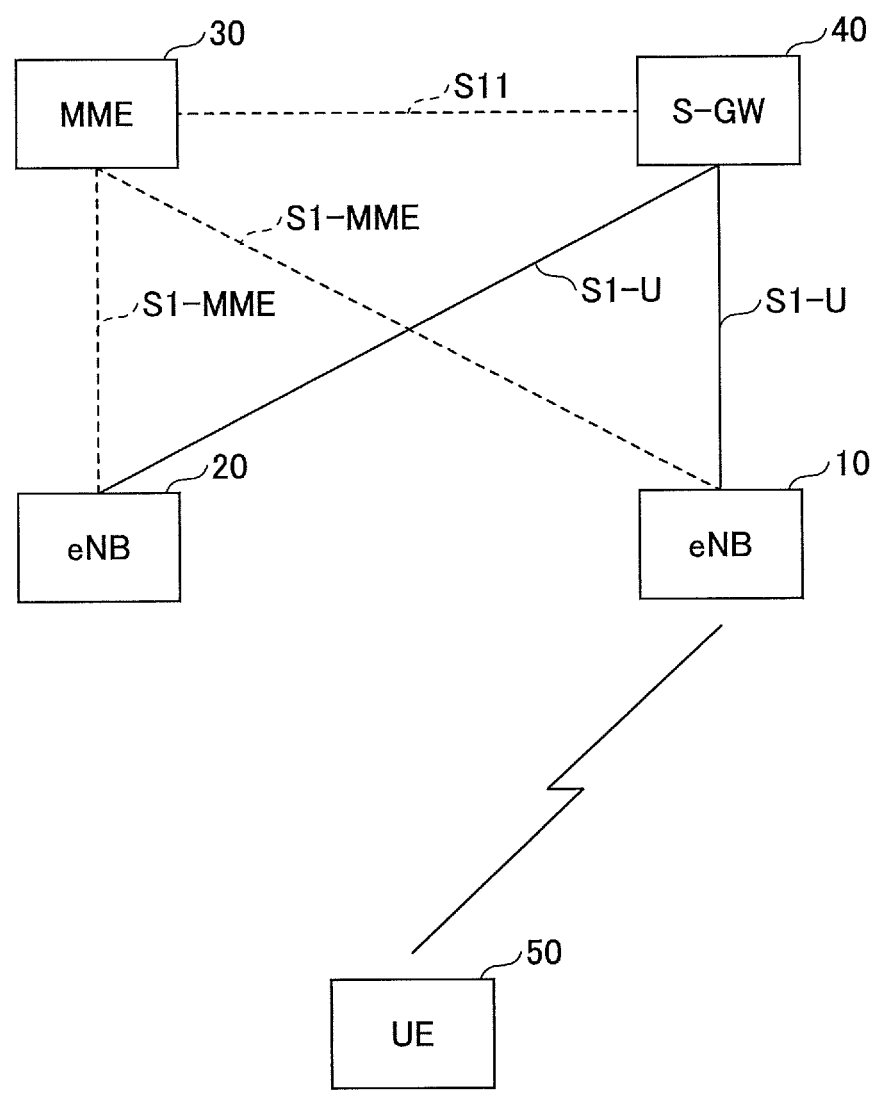
FIG. 3 is a configuration diagram of a communication system according to an embodiment of the present invention.

FIG. 3 is a diagram illustrating a configuration example of a communication system according to one or more embodiments. As illustrated in FIG. 3, the communication system of these embodiments includes an eNB 10, an eNB 20, an Mobility Management Entity (MME) 30, an Serving Gateway (S-GW) 40, and a UE 50. Note that FIG. 3 illustrates portions only related to the present embodiments with respect to a core network (Evolved Packet Core: EPC).

The UE 50 is a user apparatus such as a mobile phone. Each of the eNBs 10 and 20 is a base station. The MME 30 is a node device configured to accommodate an eNB and perform mobility control such as location registration, paging, handover, bearer establishment/deletion, and the like. The S-GW 40 is a node device configured to relay user data (U-Plane data). The MME 30 may be referred to as a communication control device. Further, the MME 30 and the S-GW 40 may be configured as a single device and may be referred to as a communication control device.

As illustrated in FIG. 3, the MME 30 and the eNBs 10 and 20 are connected via an S1-MME interface, and the S-GW 40 and the eNBs 10 and 20 are connected via an S1-U interface. Dotted connection lines indicate a control signal interface and a solid connection line indicates a user data transfer interface.

One or more of the present embodiments are, as described above, assumed to follow a scheme to allow the eNB to retain the UE context of the UE 50 in the eNB as well as allowing the UE 50 to retain the UE context relating to the connection with the eNB even when the UE 50 transitions from the RRC connected state to the RRC idle state within the same eNB. As described above, this scheme enables the reduction of the number of signaling times.

In the present embodiments, an embodiment based on a scheme of defining a new RRC state called "RRC-Suspended" (and "EPS Connection Management (ECM)-Suspended") described in Non-Patent Document 3 is described as a first embodiment, and an embodiment based on a scheme of reusing the UE context without defining a new RRC state is described as a second embodiment, as examples of the above-described scheme.

First Embodiment

The following illustrates a first embodiment in accordance with embodiments of the present invention. As described above, the scheme according to the first embodiment includes a RRC suspended state in addition to the RRC idle state and the RRC connected state). In the RRC suspended state, the UE and the eNB each retain the UE context that has been used for the connection in the RRC connected state before entering the RRC suspended state. Subsequently, when the UE transitions from the RRC suspended state to the RRC connected state, the RRC connection is established using the retained UE context.

First Embodiment: Overall Sequence Example

Figure 4:
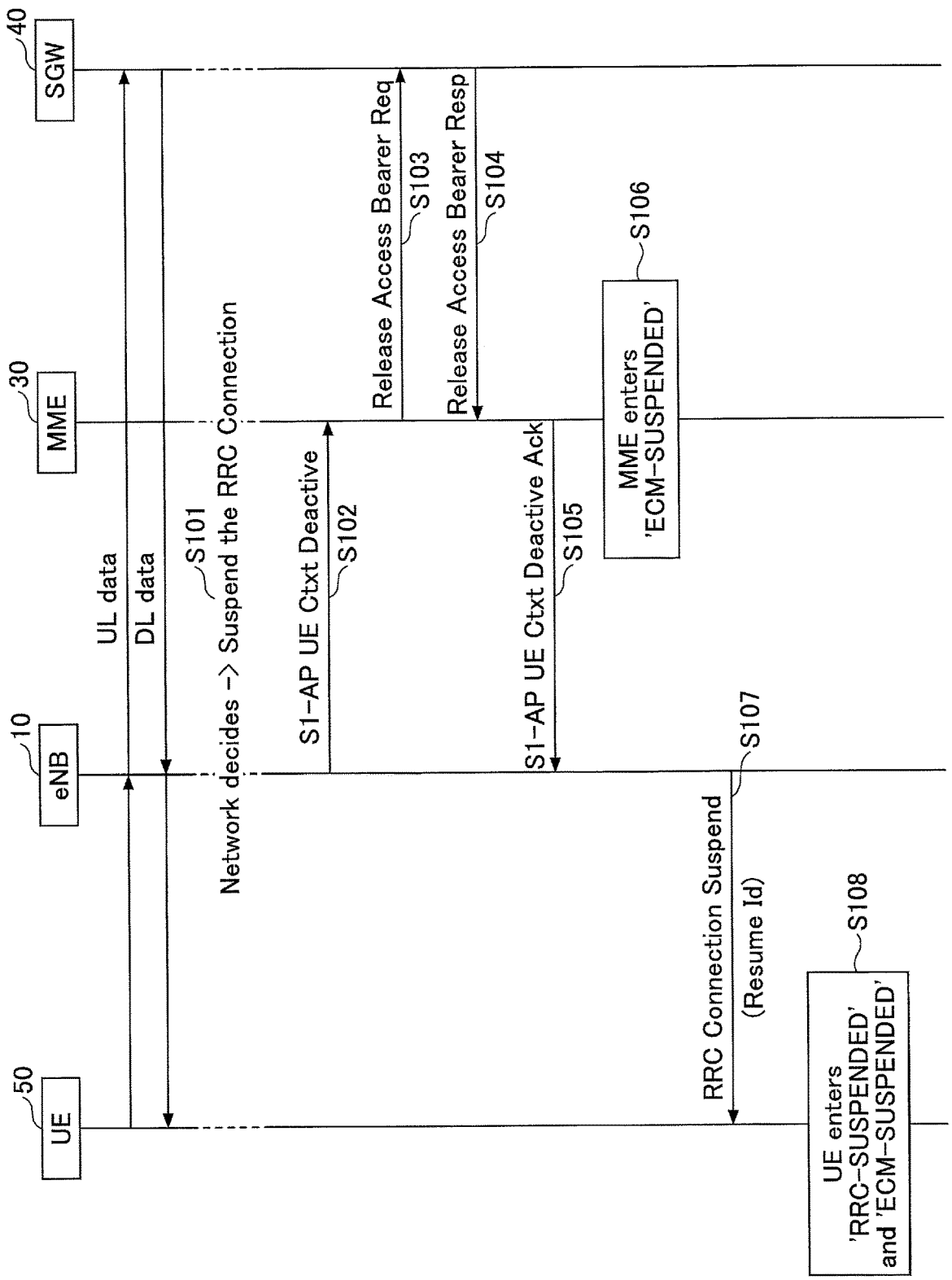
FIG. 4 is a diagram illustrating a process sequence example of an overall system in a first embodiment of the present invention.
Figure 5:
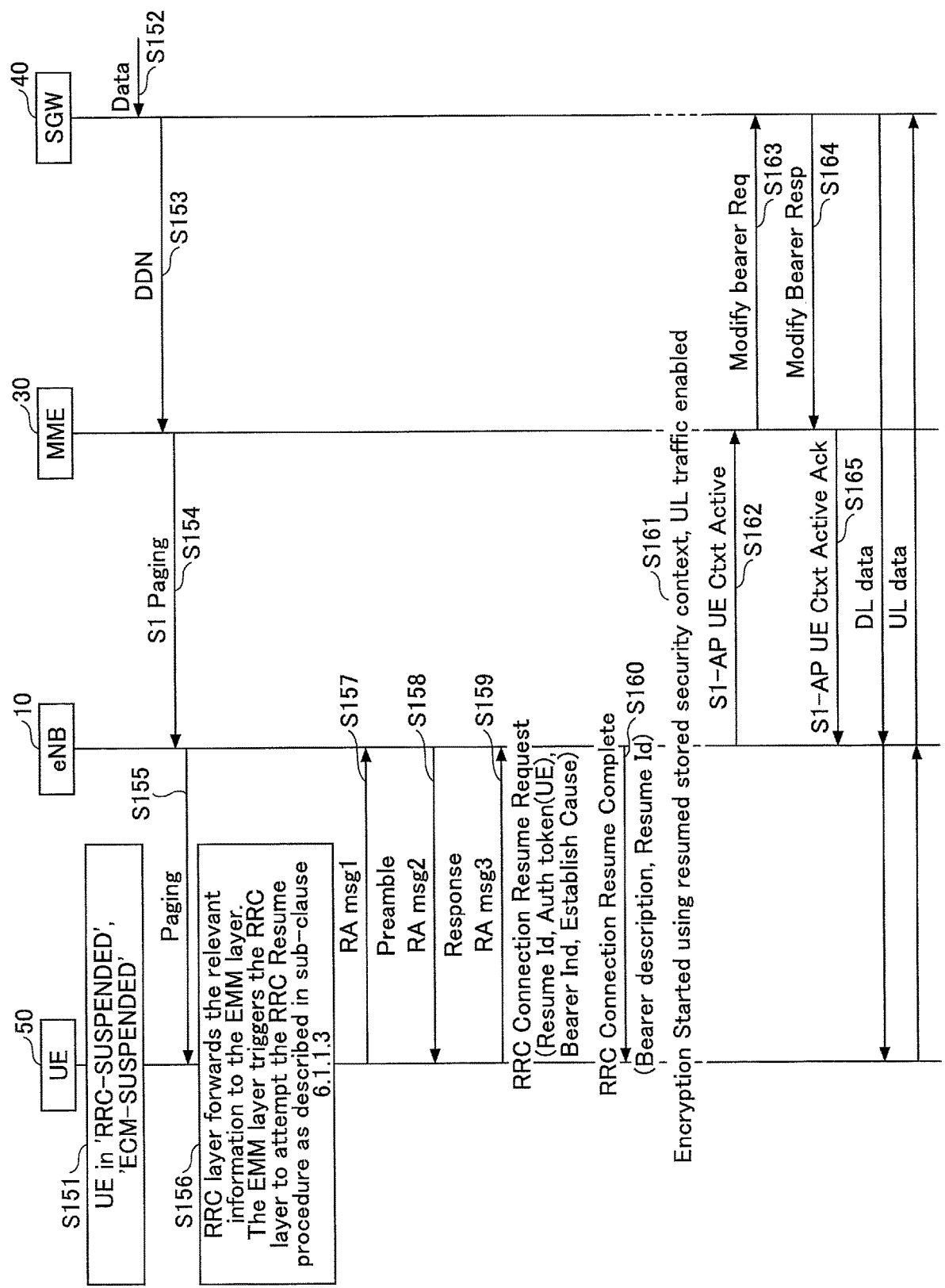
FIG. 5 is a diagram illustrating a process sequence example of an overall system in the first embodiment of the present invention.

First, the following illustrates, with reference to FIG. 4, a process sequence when the UE 50 transitions from the RRC idle state to the RRC suspended state (and the ECM suspended state), as a sequence example of an overall communication system according to the first embodiment of the present invention. Note that the later-described overall process sequence itself illustrated in FIGS. 4 and 5 is already disclosed in Non-Patent Document 3, and hence, only an outline of the overall process sequence will be described in this specification. Note that operations related to the UE capability are not disclosed in Non-Patent Document 3.

In step S101, the eNB 10 determines to suspend the RRC connection. In step S102, the eNB 10 transmits to the MME 30 a message indicating that the RRC connection of the UE 50 has been suspended. The MME 30 and the eNB 10 maintain the UE context.

In step S105, the MME 30 returns Acknowledgement (Ack) for step S102 via the messages in steps S103 and z104. In step S106, the MME 30 has become in a state of ECM-SUSPENDED.

In step S107, the eNB 10 transmits an RRC connection suspend message to the UE 50, causing the UE 50 to be in the RRC suspended state (step S108). The RRC connection suspend message includes a Resume ID (a restart ID). The Resume ID is an identifier used when restarting the RRC connection next time. In the RRC suspended state, the UE 50 and the eNB 10 each store a UE context.

In this embodiment, the UE context retained in each of the UE 50 and the eNB 10 includes, for example, an RRC configuration, a bearer configuration (including Robust Header Compression (RoHC) state information, etc.), an AS security context (Access Stratum Security Context), L2/L1 parameters (Medium Access Control (MAC), PHY configuration, etc.), and the like.

The UE 50 and the eNB 10 may retain the same information as the UE context. Alternatively, the UE 50 may retain information of the UE context only necessary for connection with the eNB 10, and the eNB 10 may retain information of the UE context only necessary for connection with the UE50.

More specifically, in the RRC suspended state, for example, the UE 50 and the eNB 10 respectively retain, as a UE context, information of RadioResourceConfigDedicated carried in the RRC Connection Setup, capability information carried in the RRC Connection Setup Complete, security related information (key information etc.), RRC Security related information carried in Security State Command, configuration information carried in RRC Connection Reconfiguration, etc. Note that the above described pieces of information are only examples, and the information retained as the UE context is not restricted to those described above, and the information retained as the UE context may include additional information, or a part of the information retained as the UE context may not be retained.

Further, in the present embodiment, UE radio capability (described as UE capability) is also included in the UE context. However, as described later, in the present embodiment, basically, the eNB 10 does not retain the UE capability in the RRC suspended state. In addition, UE capability is not limited to UE radio capability.

Since the UE 50 and the eNB 10 each retain the above-described information as the UE context, RRC connection may be established without transmitting or receiving a message such as the RRC Connection Setup Complete, the RRC Security State Command, the RRC Security State Complete, the RRC Connection Reconfiguration, and RRC Connection Reconfiguration Complete at the time at which the UE transitions from the RRC suspended state to the RRC connected state.

Next, a description is given of a sequence example in a case where the UE 50 transitions from the RRC suspended state to the RRC connected state with reference to FIG. 5. FIG. 5 illustrates a case where the UE 50 in the RRC suspended state (step S151) receives an incoming message (steps S152 to S155); however, this is only an example. A similar process may be performed for the reuse of the UE context when the UE 50 in the RRC suspended state transmits an outgoing message.

In the UE that has received the paging from the eNB 10, an RRC resume procedure is activated from the EPS Mobility Management (EMM) layer in step S156. In step S157, the Random Access Preamble is transmitted from the UE 50 to the eNB 10, and in Step S158, the Random Access Response is returned from the eNB 10 to the UE 50.

In step S159, as a message 3, the UE 50 transmits an RRC Connection Resume Request message to the eNB 10.

The RRC Connection Resume Request message includes a Resume Id (restart ID), which is information indicating that the UE 50 retains the UE context. Upon receiving the RRC Connection Resume Request message, the eNB 10 acquires the UE context of the UE 50 stored in association with the Resume Id included in the message, and resumes the bearer based on the information of the UE context. In step S160, the eNB 10 transmits an RRC Connection Resume Complete message including a Resume Id to the UE 50.

In step S161, the UE 50 and the eNB 10 resume the stored security context. Subsequently, in steps S162 to S165, a report etc., of a modified state of the UE 50 is transmitted to the MME 30.

<UE Context Suspend Procedure and Resume Procedure>

For example, Non-Patent Document 4 (R3-152688) describes an example of signaling relating to S1-AP UE Context Suspend, and resume described with reference to FIGS. 4 and 5. Non-Patent Document 4 describes signaling relating to S1-AP UE Context Suspend, and resume as changes made to Non-Patent Document 1 (3GPP TS 36.413).

Figure 6:
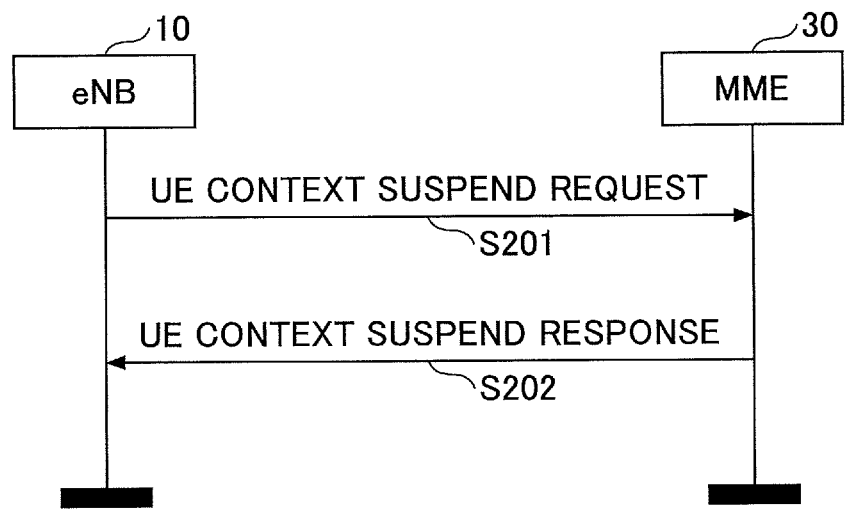
FIG. 6 is a diagram illustrating one or more embodiments of a UE context suspend procedure.

When applying a technology of Non-patent Document 4 to the first embodiment of the present invention, steps S201 and S202 illustrated in FIG. 6 are executed corresponding to steps S102 and S105 illustrated in FIG. 4.

In FIG. 6 illustrating a UE context suspend procedure, the eNB 10 transmits a UE Context Suspend request to the MME 30 in step S201. As a result, the MME 30 recognizes that the UE context is in a suspend state. Further, in step S202, the MME 30 transmits a UE Context Suspend Response to the eNB 10. As a result, the eNB 10 causes the RRC connection to be in a suspended state.

Figure 7:
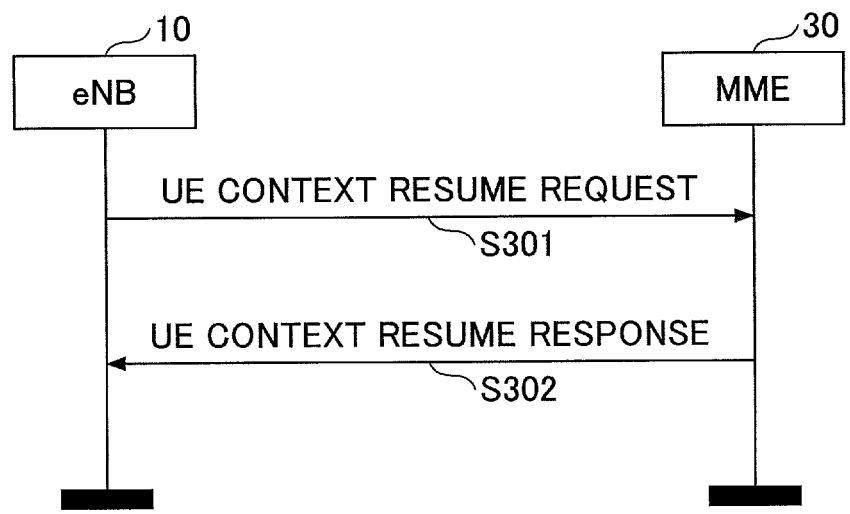
FIG. 7 is a diagram illustrating one or more embodiments of a UE context resume procedure.

When applying a technology of Non-patent Document 4 to the first embodiment of the present invention, steps S301 and S302 illustrated in FIG. 7 are executed corresponding to steps S162 and S165 illustrated in FIG. 5.

In FIG. 7 illustrating a UE context resume procedure, the eNB 10 transmits a UE Context Resume request to the MME 30 in step S301. As a result, the MME 30 recognizes that the UE context is resumed. Further, in step S302, the MME 30 transmits a UE Context Resume Response to the eNB 10.

<Retaining/Transmission of UE Capability as UE Context>

As a normal operation of the system in the present embodiment, the eNB 10 acquires the UE capability from the MME 30 in an attach procedure executed for turning on the power of the UE 50, a service request procedure from the UE 50 to the MME 30, or the like. In a case where the capability of the UE 50 is not stored in the MME 30, the eNB 10 obtains the capability of the UE 50 by direct request to the UE 50.

Figure 8:
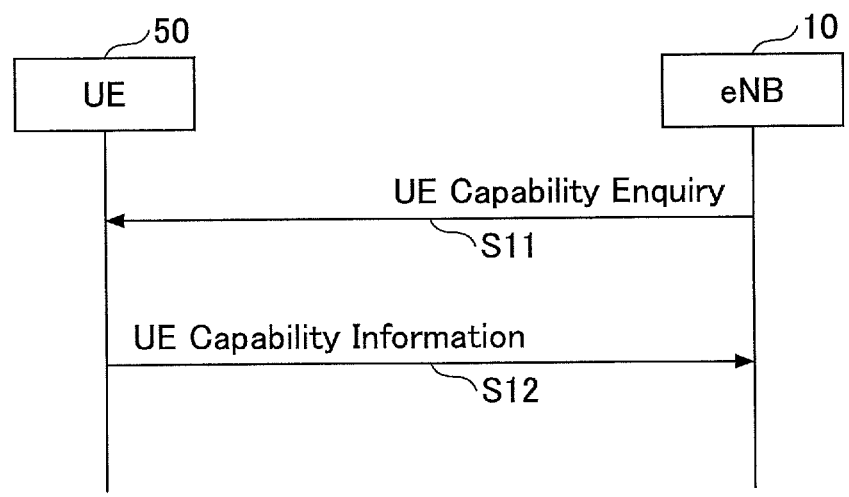
FIG. 8 is a diagram illustrating an example of a UE capability transmission procedure.

FIG. 8 illustrates an example of a procedure in a case where the eNB 10 directly requests the UE 50 to acquire the capability of the UE 50 (Non-Patent Document 5). As illustrated in FIG. 8, the eNB 10 transmits a UE Capability Enquiry (UE capability information request) to the UE 50 (step S11), and the UE 50 transmits the UE capability to the eNB 10 (step S12) in response to the request from the eNB 10. The eNB 10 transmits the UE capability acquired from the UE 50 to the MME 30, and the MME 30 retains the UE capability.

In the present embodiment, UE capability is included in the UE context. However, as already described above, the size of the UE capability is normally several hundred bits. Hence, when an attempt is made to store the capability of a large number of suspended UEs in the eNB 10 as the UE context, the eNB 10 needs to secure a large memory capacity, which leads to an increase in cost of the eNB 10.

Thus, in the first embodiment of the present invention, when the UE 50 transitions to the suspended state with retaining of the UE context, the eNB 10 will not save the UE capability of the UE 50 but deletes the UE capability.

Specifically, in the sequence illustrated in FIG. 4, after the eNB 10 transmits the RRC connection suspend message to the UE 50 in step S107, the eNB 10 deletes the UE capability of the UE 50 retained in the eNB 10.

In addition, when the UE 50 returns to the RRC connected state, the eNB 10 uses the S1-AP UE context resume procedure (steps S162 and S165 in FIG. 5, steps S301 and S302 in FIG. 7) to acquire the capability of the UE 50.

Specifically, referring first to FIG. 7, the eNB 10 requests the MME 30 to transmit the capability of the UE 50 through the UE context resume request in step S301. That is, the UE context resume request includes request information indicating that capability of the UE 50 is requested.

The MME 30 includes the retained capability of the UE 50 in the UE context resume response and transmits the UE context resume response to the eNB 10 in response to the request information included in the UE context resume request (step S302). As a result, the eNB 10 is enabled to acquire the UE capability of the UE 50.

In step S301, request information indicating that capability of the UE 50 is requested is not included in the UE context resume request, but in step S302, the MME 30 may uniformly include the retained capability of the UE 50 in the UE context resume response and transmit the UE context resume response to the eNB 10. In this case, the UE context resume request itself corresponds to the request information.

In the sequence of FIG. 5, the eNB 10 requests the MME 30 to transmit the capability of the UE 50 to resume the RRC connection in step S162. In step S165, the MME 30 transmits the retained capability of the UE 50 to the eNB 10.

FIG. 9 illustrates an example of content of a UE context resume request message in the case of performing the above-described process. FIG. 9 is based on the content added to Non-Patent Document 1 (3 GPP TS 36.413) described in Non-Patent Document 4; however, underlined portions in FIG. 9 relate to the above-described acquisition of UE capability, and are not described in Non-Patent Document 4. The same applies to the other diagrams illustrating the content of the message related to the UE context resume procedure.

As illustrated in FIG. 9, the UE context resume request message includes, as UE identifiers, MME UE S1-AP ID, eNB UE S1-AP ID, and SAE temporary mobile subscriber identity (S-TMSI). The S-TMSI is a temporary identifier of the UE 50 generated based on an identifier unique to the UE 50 and is transmitted from the MME 30 at the time of location registration of the UE 50 or the like. In the present embodiment, since the MME 30 retains the UE capability of the UE 50 in association with the S-TMSI of the UE 50, the MME 30 searches a storage unit storing a plurality of UE capabilities by using the S-TMSI of the UE 50 included in the UE context resume request message so as to extract the UE capability of the UE 50.

Note that the use of S-TMSI as the identifier of the UE is only an example. Any identifier may be used insofar as the UE capability of the UE 50 is capable of being extracted. For example, instead of including the S-TMSI in the UE context resume request message, the MME 30 may specify the UE 50 with the MME UE S1-AP ID or the eNB UE S1-AP ID to extract the UE capability of the UE 50.

FIG. 10 illustrates an example of content of a UE context resume response message. As illustrated in FIG. 10, the UE context resume response message includes the UE capability of the UE 50 extracted by the MME 30.

<Transfer of UE Capability when Transitioning to Suspended Status>

In the first embodiment of the present invention, the eNB 10 may transfer the UE capability of the UE 50 to the MME 30 when the UE 50 transitions to the suspended state with retaining the UE context. More specifically, the UE capability of the UE 50 is transferred in step S102 in FIG. 4 and step S201 in FIG. 6.

Upon receiving the UE capability (referred to as "transfer UE capability"), the MME 30 stores the transferred UE capability. When the MME 30 has already stored the UE capability, the MME 30 may, for example, overwrite the already retained UE capability with the transferred UE capability. In addition, when the transferred UE capability includes updated information or new information with respect to the already stored UE capability, only the updated information or new information may be overwritten.

This transfer of the UE capability is not mandatory because the UE capability has been transmitted from the eNB 10 to the MME 30 in an attach procedure or the like in a previous stage. However, the latest UE capability may be retained by the MME 30 by performing this transfer of the UE capability.

FIG. 11 illustrates an example of a content of a UE context suspend request message in a case of performing the above-described transfer. As illustrated in FIG. 11, the UE context suspend request message includes the UE capability. FIG. 12 illustrates an example of content of the UE context suspend response message.

Second Embodiment

Next, a second embodiment of the present invention is illustrated. As described above, the second embodiment follows a scheme to allow the UE and the eNB to retain the UE context when the UE is in the RRC idle state and to reuse the retained UE context when the UE transitions to the RRC connected state, thereby enabling the reduction in the number of signaling times without defining a new state such as RRC-Suspended.

<Overall Sequence Example>

First, a scheme of performing paging via the MME 30 when there is an incoming signal to the UE 50 in the RRC idle state will be described as a sequence example of an overall communication system according to a second embodiment of the present invention. More specifically, a description is given, with reference to FIG. 13, of a process sequence in which the UE 50 is connected to the eNB 10 to become in the RRC connected state, is then in the RRC idle state in a cell controlled by the eNB 10, and subsequently receives an incoming signal within the same cell.

Figure 13:
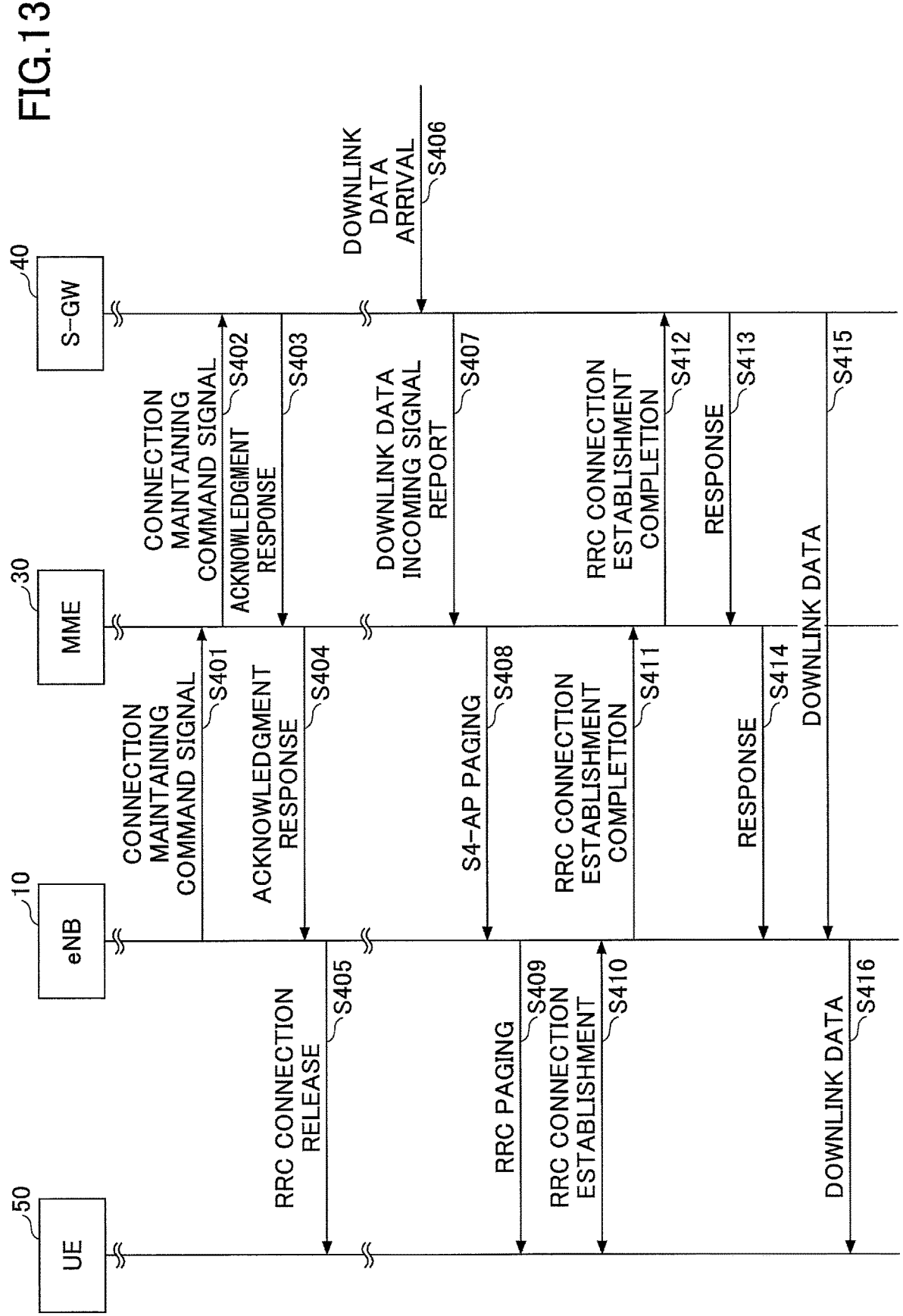
FIG. 13 is a diagram illustrating a process sequence example of an overall system in a second embodiment of the present invention.

The process in FIG. 13 is based on the assumption that the UE 50 is in the RRC connected state in the cell of the eNB 10, and the connection of the S1-C/U related to the UE 50 has been established. In FIG. 13, an S1-C connection includes a connection between the eNB 10 and the MME 30 and a connection between the MME 30 and the S-GW 40, and the S1-U connection includes a connection between the eNB 10 and the S-GW 40. When the S1-C connection has been established, a signal (data) relating to the UE 50 may be transmitted and received between the corresponding node apparatuses without executing a procedure for connection setup such as a connection establishment signal.

Before describing the procedure of FIG. 13, an outline of an example of a procedure when the UE 50 first connects to the eNB 10 is described (Non-Patent Document 5). Note that the procedure related to this initial connection may also be applied to the first embodiment. Upon random access of the UE 50, the eNB 10 transmits the RRC Connection Setup to the UE 50, allows the UE 50 to be in the RRC connected state, and receives the RRC Connection Setup Complete from the UE 50. Subsequently, the eNB 10 receives the Initial Context Setup Request from the MME 30, transmits the RRC Security State Command to the UE 50, receives the RRC Security State Complete from the UE 50. In addition, the eNB 10 also transmits the RRC Connection Reconfiguration to the UE 50, and receives the RRC Connection Reconfiguration Complete from the UE 50, and transmits the Initial Context Setup Response to the MME 30. The UE context has been established, retained, and the like in the UE 50 and the eNB 10 through such a procedure. The UE context is also retained in the MME 30.

As illustrated in FIG. 13, in the RRC connected state, the eNB 10 transmits a connection maintaining command signal to the MME 30 (step S401) In addition, the MME 30 transmits a connection maintaining command signal to the S-GW 40 (step S402).

The connection maintaining command signal is a signal that gives an instruction to retain downlink data in the S-GW 40 at the time of an incoming signal being received by the UE 50 while maintaining the S1-C/U connection relating to the UE 50 to perform paging via the MME 30.

Upon receiving the connection maintaining command signal, the S-GW 40 transmits an acknowledgment response to the MME 30 indicating that the S-GW 40 has acknowledged the connection maintaining command signal (step S403), and the MME 30 transmits the acknowledgment response to the eNB 10 (step S404).

Transmission of the connection maintaining command signal from the eNB 10 to the MME 30 with respect to the UE 50 is triggered by, for example, occurrence of an event causing the UE 50 to transition to the RRC idle state in the eNB 10.

The event of causing the UE 50 to transition to the RRC idle state indicates an example in which no communication (uplink and downlink user data communication) with the UE 50 has been detected for a certain period of time due to the expiration of a predetermined timer (e.g., UE Inactivity Timer); however, the event is not restricted to this example.

FIG. 13 is based on the assumption that the transmission of the connection maintaining command signal is triggered by the detection of no communication with the UE 50 (uplink and downlink user data communication) or a certain period of time. Hence, after steps S401 to 404, the eNB 10 transmits the RRC Connection Release to the UE 50 to cause the UE 50 to transition to the RRC idle state (step S405).

In the second embodiment, even when the UE 50 transitions to the RRC idle state, the UE context that has been established at the time of RRC connection is retained in each of the UE 50 and the eNB 10.

However, similar to the first embodiment, the eNB 10 does not basically retain the UE capability of the UE context.

Hence, similar to deletion of the UE capability after step S107 in FIG. 4, the eNB 10 deletes the UE capability of the UE 50 retained in the eNB 10 after step S405 (RRC Connection Release transmission) in FIG. 13.

Further, in step S401, the eNB 10 includes the UE capability in the connection maintaining command signal and transmits the connection maintaining command signal to the MME 30 in a manner similar to the first embodiment in which the eNB 10 transfers the UE capability of the UE 50 when the UE transitions to the suspended state.

Upon receiving the UE capability (referred to as "transfer UE capability"), the MME 30 stores the transferred UE capability. When the MME 30 has already stored the UE capability, the MME 30 may, for example, overwrite the already stored UE capability with the transferred UE capability. In addition, when the transferred UE capability includes updated information or new information with respect to the already stored UE capability, only the updated information or new information may be overwritten.

Subsequently, downlink data for the UE 50 is generated, and the generated downlink data arrives at the S-GW 40 (step S406). In this case, although the S1-U connection has been established, the S-GW 40 keeps the downlink data in a buffer without transferring the downlink data to the eNB 10 based on the connection maintenance command signal received in step S402.

The S-GW 40 transmits a downlink data incoming signal report to the MME 30 (step S407), and the MME 30 transmits an S1-AP paging signal addressed to the UE 50 to the eNB 10 (step S408). This S1-AP paging signal itself is similar to an existing paging signal and is thus transmitted to each of eNBs in a tracking area of the UE 50; however, FIG. 13 depicts an example of transmission to the eNB 10.

Upon receiving the S1-AP paging signal, the eNB 10 transmits an RRC paging signal to the UE 50 controlled by the eNB 10 itself (step S409).

Upon receiving the RRC paging signal, the UE 50 performs an RRC connection establishment procedure to establish an RRC connection (step S410) The details of the RRC connection establishment procedure will be described later.

With the procedure of step S410, the UE 50 switches from the RRC idle state to the RRC connected state. At this time, the UE context retained in each of the UE 50 and the eNB 10 changes from the inactive state to the active state. That is, in the procedure of step S410, the UE contexts retained in UE 50 and eNB 10 are activated, respectively.

In step S411, the eNB 10 transmits, to the MME 30, an RRC connection establishment completion, which is a signal indicating that the establishment of the RRC connection is completed. This RRC connection establishment completion signal may be a signal indicating that the UE context of the UE 50 has been activated.

Similar to step S162 in FIG. 5 and step S301 in FIG. 7 in the first embodiment, in step S411, the eNB 10 includes, in the RRC connection establishment completion signal, request information indicating that UE capability of the UE 50 is requested and transmits the RRC connection establishment completion signal. The request information is, for example, the S-TMSI (an example of a UE identifier) of the UE 50. Similar to the first embodiment, the MME 30 may uniformly transmit the UE capability of the UE 50 to the eNB 10 in a later-described step S414 without including the request information.

The MME 30 transmits the RRC connection establishment completion signal to the S-GW 40 (step S412).

Then, in step S413, the S-GW 40 transmits to the MME 30 a response signal to the RRC connection establishment completion signal. In step S414, the MME 30 transmits to the eNB 10 a response signal to the RRC connection establishment completion signal in step S411. The response signal in step S414 may be a signal of Ack to a signal indicating that the UE context has been activated.

Similar to step S165 in FIG. 5 in the first embodiment and step S302 in FIG. 7, the MME 30 extracts the retained capability of the UE 50 based on the request information (or the UE identifier other than the request information) included in the RRC connection establishment completion signal in the step S411, includes the extracted capability of the UE 50 in the response signal of the step S414, and transmits the response signal to the eNB 10. As a result, the eNB 10 is enabled to acquire the UE capability of the UE 50.

Subsequently, the S-GW 40 starts transferring the retained downlink data to the eNB 10 (step S415). The downlink data reaches the UE 50 from the eNB 10 (step S416). Transmission of downlink data to the UE 50 is thus started.

In the RRC connection establishment procedure in step S410 of FIG. 13, the UE context that has been established and retained in each of the UE 50 and the eNB 10 at the time of the RRC connection is used. Accordingly, it is possible to establish the RRC connection without transmitting and receiving conventionally required messages such as RRC Security State Command, RRC Security State Complete, RRC Connection Reconfiguration, RRC Connection Reconfiguration Complete, etc.

In this case, the UE context retained in each of the UE 50 and the eNB 10 includes, for example, an RRC configuration, a bearer configuration (including RoHC state information, etc.), an Access Stratum (AS) Security Context), L2/L1 parameters (MAC, PHY configuration, etc.), and the like. The UE capability is also included in the UE context; however, as described above, the eNB 10 is configured not to retain the UE capability while the UE 50 is in the RRC idle state.

In addition, the UE 50 and the eNB 10 may retain the same information as the UE context. Alternatively, the UE 50 may retain information of the UE context only necessary for connection with the eNB 10, and the eNB 10 may retain information of the UE context only necessary for connection with the UE50.

In addition, in the second embodiment, the eNB 10 retains the UE context in a storage unit in association with the identifier (UE identifier) of the UE corresponding to the UE context. The type of the UE identifier is not particularly specified; however, in the second embodiment, SAE temporary mobile subscriber identity (S-TMSI) is used as a UE identifier as an example.

<Example of RRC Connection Establishment Procedure>

Figure 14:
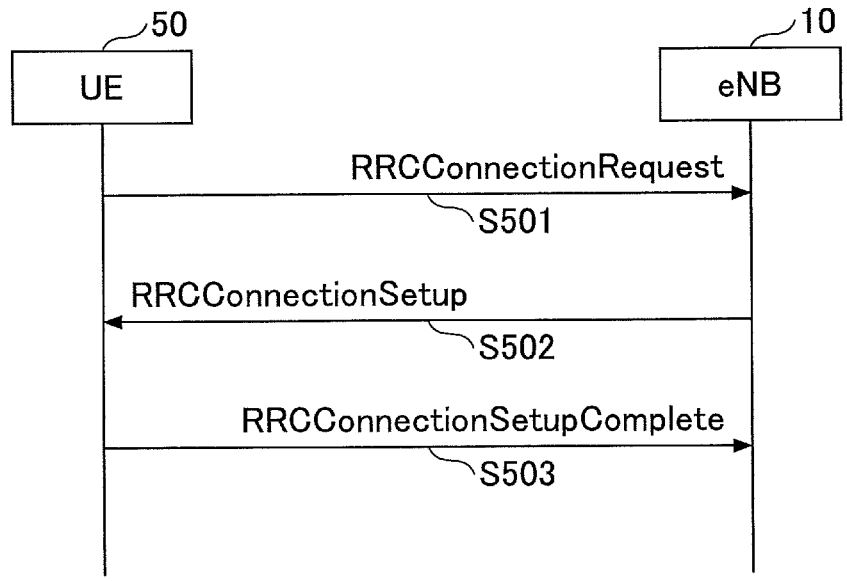
FIG. 14 is a diagram illustrating a connection establishment procedure in the second embodiment of the present invention.

Next, a description is given of, with reference to the sequence of FIG. 14, the RRC connection establishment procedure between the UE 50 and the eNB 10 in the second embodiment. Note that an example of the sequence illustrated in FIG. 14 is based on the assumption of the procedure of step S410 in FIG. 13; however, the sequence illustrated in FIG. 14 is not limited to this example. For example, the sequence illustrated in FIG. 14 may be in the RRC connection establishment procedure at the time of transmission of an outgoing signal from the UE 50.

That is, it is assumed that prior to performance of the sequence illustrated in FIG. 14, a Random Access Preamble is transmitted from the UE 50 to the eNB 10 and a Random Access Response is transmitted from the eNB 10 to the UE 50.

In step S501, the UE 50 transmits an RRC Connection Request message (RRC connection request) to the eNB 10 with a resource allocated by the UL grant included in the Random Access Response. In the second embodiment, in step 501, the UE 50 uses the spare bit (1 bit) in the RRC Connection Request message to report to the eNB 10 that the UE 50 retains the UE context. For example, a bit being set to be (bit="1") indicates that the UE 50 retains the UE context. The information indicating that the UE 50 retains the UE context may also hereinafter be referred to as "UE context retaining information".

The RRC Connection Request message includes, in addition to the above bit, a UE identifier (specifically, SAE temporary mobile subscriber identity [S-TMSI]) for identifying the UE 50. The S-TMSI is a temporary identifier of the UE 50 generated based on an identifier unique to the UE 50 and is transmitted from the MME 30 at the time of location registration of the UE 50 or the like. In the second embodiment, it is assumed that the UE 50 and each eNB have S-TMSI for identifying the UE 50.

Upon receiving the RRC Connection Request message in step 501, the eNB 10 reads the UE context retaining information and the UE identifier from the message, such that the eNB 10 recognizes that the UE 50 identified by the UE identifier retains the UE context, and searches the storage unit for the UE context corresponding to the UE identifier from the retained multiple UE contexts. That is, the eNB 10 performs matching processing of the UE identifier.

In step S502, upon detecting the UE context corresponding to the UE identifier as a result of the above-described search, the eNB 10 reports to the UE 50 that the eNB 10 retains the UE context of the UE 50 based on the RRC Connection Setup message (RRC connection establishment message) and requests the UE 50 to transmit information for authentication of the UE 50.

Upon receiving the RRC Connection Setup message including information indicating that the enB 10 retains the UE context of the UE 50, the UE 50 continues to use the retained UE context (bearer, security key, configuration, etc.).

Further, the RadioResourceConfigDedicated included in the RRC Connection Setup message includes parameter values related to bearer, MAC, PHY configuration, etc. However, upon receiving the RRC Connection Setup message including the report/request in step 502, the UE 50 ignores the parameter values reported via the RadioResourceConfigDedicated and continues to use the parameter values of the retained UE context. Note that the UE 50 may use the reported parameter values without ignoring the parameter value reported via the RadioResourceConfigDedicated. As a result, when the already retained parameter values are changed by the eNB 10, the UE 50 may reflect such change.

Next, in step 503, the UE 50 includes authentication information such as Authentication token, shortMAC-I, and the like in the RRC Connection Setup Complete message and transmits the RRC Connection Setup Complete message to the eNB 10. The authentication information such as Authentication token, shortMAC-I, etc., is information used by the eNB 10 to authenticate the UE 50.

Upon receiving the RRC Connection Setup Complete message, the eNB 10 uses the authentication information included in the RRC Connection Setup Complete message to authenticate that the UE 50 is a correct UE corresponding to the UE context detected by the UE identifier. Thereafter, each of the UE 50 and the eNB 10 establishes (resumes) a connection by using the retained UE context. Note that step 503 is not necessarily mandatory for establishing (resuming) the connection using the retained UE context, and step 503 may thus not be executed.

<Modification of RRC Connection Establishment Procedure>

In the following, a modified RRC connection establishment procedure is described with reference to FIG. 14 since the sequence itself in a modified RRC connection establishment procedure is the same as the sequence illustrated in FIG. 14. Note that the sequence illustrated in FIG. 14 for the modified RRC connection establishment procedure is also based on the assumption of the procedure of step S410 in FIG. 13; however, the sequence for the modified RRC connection establishment procedure is not limited to this example.

That is, it is assumed that prior to performance of the sequence illustrated in FIG. 14, a Random Access Preamble is transmitted from the UE 50 to the eNB 10 and a Random Access Response is transmitted from the eNB 10 to the UE 50.

In step S501, the UE 50 transmits an RRC Connection Request message (RRC connection request) to the eNB 10 with a resource allocated by the UL grant included in the Random Access Response. In the modified RRC connection establishment procedure, in step 501, when the UE 50 retains the UE context, the UE 50 includes the authentication information in the RRC Connection Request message to transmit the RRC Connection Request message. The authentication information is information used by the eNB 10 to authenticate the UE 50, and includes, for example, C-RNTI, Physical Cell Identifier (PCI), and Short MAC-I used in the previous RRC connection.

The authentication information is also an example of UE context retaining information for reporting to the eNB 10 that the UE 50 retains the UE context.

When the eNB 10 that has received the RRC Connection Request message in step 501 authenticates the UE 50 using the authentication information and detects that the authentication is successful and that the UE context of the UE 50 is retained, the eNB 10 transmits to the UE 50 an RRC Connection Setup message (RRC connection establishment message) including information having an instruction to activate the UE context retained by the UE 50 (step 502). The above-described detection may be performed, for example, by the eNB 10 searching the storage means for the UE context corresponding to the UE identifier (e.g., S-TMSI) from among the multiple UE contexts retained by the eNB 10. The information having an instruction to activate (activate) the UE context is an example of context-retaining information indicating that the eNB 10 retains the UE context of the UE 50.

When the eNB 10 fails to detect that the UE context of the UE 50 is retained, the eNB 10 transmits, to the UE 50, an RRC Connection Setup Message (RRC connection establishment message) that does not include information having an instruction to activate the UE context retained by the UE 50.

Upon receiving the RRC Connection Setup message including information having an instruction to activate the UE context, the UE 50 activates the retained UE context (bearer, security key, configuration, etc.). Activating the UE context is to validate the retained UE context, and includes, for example, setting of various radio resources, measurement setting, updating processing of authentication key, and the like.

Further, the RadioResourceConfigDedicated included in the RRC Connection Setup message may include parameter values related to bearer, MAC, PHY configuration, etc.; however, the UE 50 that has received the RRC Connection Setup message including the above activation instruction in step 502 applies the parameter values reported via the RadioResourceConfigDedicated. Such parameter values may, for example, be applied according to "5.3.10 Radio resource configuration" in Non-Patent Document 5. That is, setting based on information included in RadioResourceConfigDedicated is performed.

As an example, in a case where the UE 50 retains information "A" in RadioResourceConfigDedicated at the previous RRC connection as part of the UE context and receives information "B" via RadioResourceConfigDedicated in step 502, the UE 50 is enabled to use the information "B" in addition to the information "A".

Further, the UE 50 retains the information "A" in the RadioResourceConfigDedicated at the previous RRC connection as part of the UE context and receives information of the same type as "A" but having a different value "A'" via RadioResourceConfigDedicated in step 502, the UE 50 updates (change) the retained "A" with "A'" received in step 502.

That is, the above processing enables setting a parameter difference between the stored RadioResourceConfigDedicated information and the RadioResourceConfigDedicated information received in Step 502. This parameter difference setting is called "delta configuration".

Next, in step 503, the UE 50 transmits an RRC Connection Setup Complete message to the eNB 10.

<Example of RRC Connection Release Procedure>

In the second embodiment, the UE 50 may always retain the UE context when the UE 50 receives the RRC Connection Release message from the eNB 10 and the UE 50 transitions to the RRC idle state; alternatively, the UE 50 may retain the UE context only when the RRC Connection Release message includes information having an instruction to retain the UE context. The following illustrates the latter example.

Figure 15:
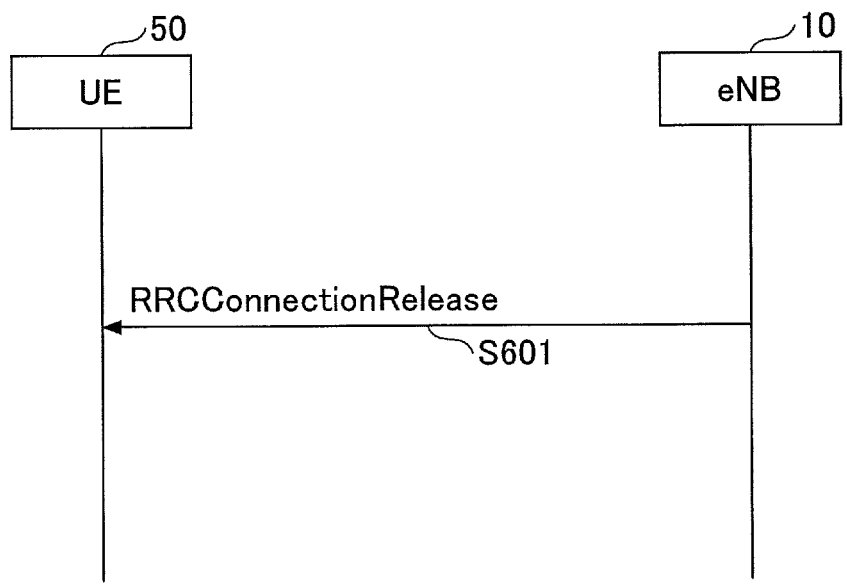
FIG. 15 is a diagram illustrating a connection release procedure in the second embodiment of the present invention.

As illustrated in FIG. 15, when the eNB 10 causes the UE 50 to transition to the RRC idle state, the eNB 10 transmits an RRC Connection Release message to the UE 50 (step 601).

The RRC Connection Release message includes indication information (indication) instructing the UE 50 to keep retaining the UE context in the RRC idle state. With regard to the indication information, a new indication may be included in the message, or a spare bit of an existing release cause may be used.

When detecting the indication information via the RRC Connection Release message, the UE 50 during the RRC idle state continues to retain the UE context (bearer information, security information, etc.) from the time of transitioning to the RRC idle state during the RRC idle state. Note that a predetermined time may be set in the UE 50 in advance, and when during the RRC idle state the predetermined time has elapsed from the time at which the UE 50 transitioned to the RRC idle state, the UE 50 may invalidate the retained UE context to release (delete) the retained UE context.

(Size Reduction of UE Capability)

The following illustrates size reduction of the UE capability in the present embodiment. The examples described below may be applied to both the first embodiment and the second embodiment.

It is expected, in the future, that the number of terminals having limited functions as compared to general mobile terminals such as Narrow Band Internet of Things UE (NB-IoT UE) and Low cost Machine Type Communication UE (MTC UE) will increase.

For example, the transmission speed of the NB-IoT UE is low because the NB-IoT UE communicates with a bandwidth of 180 KHz or less (minimum 3.75 or 15 KHz) for uplink communication. In the following, UEs such as NB-IoT UE and Low cost MTC UE may be collectively referred to as a "low-speed UE" for convenience.

Meanwhile, the existing LTE UE capability is specified to expand with nesting of the parameters specified from Rel-8, and capability for low-speed UE such as NB-IoT UE is additionally specified for existing LTE UE capability. Accordingly, overhead caused by defining the expansion of parameters of Rel-8 to Rel-12 is generated. For example, when specifying the capability of the NB-IoT UE in addition to the UE capability of the Rel-12 version 12.7.0 specification, the UE capability will be at least 17 bytes in size.

The existing LTE UE capability includes several mandatory parameters, which serve as one factor of increasing the size of the UE capability.

For example, feature group indicators (FGIs) may be omitted in a case where the UE supports all FGIs; however, such UEs are not in current usage; it is mandatory for the UE to add a bit string of 96 bits of FGI to the UE capability and to always report the corresponding presence/absence (1/0) of each FGI. It is also mandatory for the UE to always report information indicating whether or not a measurement gap is necessary. Further, it is mandatory for the UE to always report packet data control protocol (PDCP) parameters.

In the present embodiment, new UE capability is introduced for low-speed UE such as NB-IoT UE.

Modification of the specification (Non-Patent Document 5) corresponding to the UE capability is illustrated in FIGS. 16 to 18. The additional parts are underlined in FIGS. 16 to 18.

FIGS. 16A and 16B illustrate a UE-CapabilityRAT-ContainerList serving as an information element included in a UE Capability Information message transmitted from the UE 50 to the eNB 10 (and the MME 30). The UE-CapabilityRAT-ContainerList includes ueCapabilityRAT-Container for each Radio Access Technology (RAT). In the present embodiment, UE-EUTRA-Capability-BL is added to RAT: E-UTRA. BL is an abbreviation for "bandwidth reduced low complexity", and BL UE indicates a low-speed UE such as the NB-IoT UE described above.

FIG. 17 illustrates content of UE-EUTRA-Capability-BL. The UE-EUTRA-Capability-BL corresponds to the UE capability (UE radio capability) that the low-speed UE includes in the UE Capability Information message.

As described in FIG. 17, the UE-EUTRA-Capability-BL is used in order for the BL UE (UE 50 serving as an example in this case) to transmit UE capability (UE Radio Access Capability Parameters) to E-UTRA (eNB 10 serving as an example in this case).

With respect to the UE category (ue-Category) in the content of the information element of the UE-EUTRA-Capability-BL illustrated in FIG. 17, the existing UE category is not included, and only a newly defined BL UE category is included. For example, the UE 50 includes a category indicating "Low Cost MTC UE" as m1 and a category indicating "NB-IoT UE" as m2, depending on the category of the UE 50 itself. However, these are merely examples.

With respect to the mandatory FGI, PDCP parameter, and a measurement gap in the existing technology, default capabilities of the FGI, PDCP parameter, and a measurement gap are defined; however, parameters of the FGI, PDCP parameter, measurement gap are not signaled. That is, default information is not included in UE capability. Since a BL UE has limited functions, it is easy to assume the minimum functions that all BL UEs should have. Thus, the functions (capabilities) that all BL UEs are expected to have are defined as the default capability.

A UE having a capability difference with respect to the default capability, e.g., a UE having an additional capability with respect to the default capability, reports only the difference (e.g., a parameter indicating additional capability) by including it in the UE capability. By enabling reporting of such difference, flexibility may be given to the functions implemented in the BL UE.

More specifically, for example, a measurement gap is required by default for the corresponding frequency band and is not included in the UE capability. Only when the measurement is "capable" with "no" gap, a value indicating it is included as "GaplessMeas-r13" in FIG. 17 in the UE capability.

As the PDCP parameters, default values of parameters such as a ROHC profile are defined. Then, only when the PDCP parameters of the UE 50 differ from the default values, values of the PDCP parameters are included in the UE capability as the "PDCP-Parameters-r13" in FIG. 17.

In addition, as for physical layer parameters, they are defined by default. And, when a UE can optionally support a physical layer parameter, the UE includes the value in the UE capability as "PhyLayer Parameters" in FIG. 17.

As for supporting ability of other RAT such as 3G, and GSM/EDGE Radio Access Network (GERAN), for example, it is defined that UEs do not have such supporting ability by default. Only when there is another RAT that a UE can support, the UE includes the value in the UE capability as "interRAT-Parameters-r13" in FIG. 17.

With respect to a Duplex scheme, half duplex is, for example, supported only for the corresponding frequency band by default. The UE 50 includes a value indicating a value of full duplex in the UE capability as "Full Duplex-r13" in FIG. 17 only when the UE 50 additionally supports the full duplex.

FIG. 18 illustrates examples of definitions of FGI newly defined for BL UE. In the example illustrated in FIG. 18, when the UE 50 corresponding to Rel-10 that supports both Frequency Division Duplex (FDD) and Time Division Duplex (TDD) reports a Category M1, the UE 50, for example, includes 103 as a value of FGI (SupportedFGIs-r13 in FIG. 17).

<Size Reduction of UE Capability with Respect to Operations of First and Second Embodiments>

Even in a case of using the UE capability the size of which is reduced as described above, the operations in the first and second embodiments may not be changed from those already described or may be changed as follows.

That is, in the first and second embodiments, the eNB 10 deletes the UE capability when the UE 50 transitions to the suspended state/idle state. However, when the UE capability subject to deletion is the UE capability with the reduced size, the eNB 10 may not delete the UE capability. This is because the memory capacity reduction related to UE capability may be achieved without deleting the UE capability. As to whether the UE capability has been reduced in size, the eNB 10 may, for example, determine that the UE capability is the UE capability with reduced size when the UE category in the UE capability is M1 or M2.

Also, as described above, when UE capability is not deleted, the eNB 10 does not acquire UE capability (e.g., steps S162 and S165 in FIG. 5, and steps 411 and S414 in FIG. 13) from the MME 30.

(Apparatus Configuration Example)

Next, an illustration is given of an apparatus configuration example in accordance with one or more embodiments of the present invention (including first embodiment, second embodiment, and UE capability size reduction). The configuration of each apparatus described below illustrates only functional units particularly related to the embodiments of the present invention, and includes not-illustrated functions to at the least serve as an apparatus in a communication system in compliance with LTE (indicating LTE including EPC). The functional configuration illustrated in each of the figures is merely an example. Any functional division and any names of the functional components may be applied insofar as operations according to the present invention may be executable.

Each apparatus may have all the functions of the first embodiment, the second embodiment, the UE capability size reduction, or may have the function of only one of the first embodiment and the second embodiment. Alternatively, each apparatus may have the function of one of the first example and the second example and the UE capability size reduction function. In the following description, it is assumed that each apparatus has all functions of the first embodiment, the second embodiment, the UE capability size reduction.

<Configuration Example of Mme and S-GW>

First, an illustration is given, with reference to FIG. 19, of a configuration example of an MME 30 and an S-GW 40. As illustrated in FIG. 19, the MME 30 includes an eNB communication unit 31, an SGW communication unit 32, a communication control unit 33, and a UE context management unit 34.

The eNB communication unit 31 includes a function to transmit and receive a control signal with the eNB via an S1-MME interface. The SGW communication unit 32 includes a function to transmit and receive a control signal with the S-GW via an S11-interface. The UE context management unit 34 includes a storage unit configured to retain a UE context. The UE context management unit 34 also includes a function to acquire, when the MME 30 receives a signal requesting the UE capability from the eNB 10, the UE capability corresponding to the UE identifier included in the request from the storage unit and transmits the acquired UE capability to the eNB 10 via an eNB communication unit 31 or the like. The UE context management unit 34 also has a function to store, when the MME 30 receives the UE capability from the eNB 10, the UE capability in the storage unit in association with the UE identifier.

Further, the S-GW 40 includes an eNB communication unit 41, an MME communication unit 42, an NW communication unit 43, and a communication control unit 44. The eNB communication unit 41 includes a function to transmit and receive data with the eNB via an S1-U interface. The MME communication unit 42 includes a function to transmit and receive a control signal with the MME via an S11-interface. The NW communication unit 43 includes a function to transmit and receive a control signal and data with node apparatuses on the core NW.

Note that the description that has been given so far is common to the first embodiment and the second embodiment. In the following, the function of the second embodiment is specifically described.

The communication control unit 33 includes a function to instruct, when receiving a connection maintaining command signal from the eNB 10, the SGW communication unit 32 to transmit the connection maintaining command signal to the S-GW, and a function to instruct, when receiving a confirmation response from the S-GW 40, the eNB communication unit 31 to transmit a confirmation response to the eNB. The communication control unit 33 includes a function to report the UE capability to the UE context management unit 34 when the UE capability is included in the connection maintenance instruction signal.

In addition, the communication control unit 33 reports, when receiving an RRC connection establishment completion signal from the eNB 10, the RRC connection establishment completion signal to the UE context management unit 34 to cause the UE context management unit 34 to acquire the UE capability. The communication control unit 33 may also have a function to include the UE capability acquired by the UE context management unit 34 in a response signal when transmitting the response signal (step S414 of FIG. 13) to the eNB 10.

The communication control unit 44 includes a function to instruct the MME communication unit 42 to transmit an acknowledgment response to the MME 30 when receiving the connection maintenance instruction signal from the MME 30. In a case of receiving the connection maintenance instruction signal from the MME 30, the communication control unit 44 includes a function to instruct the NW communication unit 43 to retain downlink data in a buffer when receiving the downlink data addressed to the corresponding UE, and to instruct the NW communication unit 43 to transmit the downlink data when receiving the RRC connection establishment completion from the eNB.

Note that the MME 30 and the S-GW 40 may be configured as a single apparatus. In such a case, communication performed via the S11-interface between the SGW communication unit 32 and the MME communication unit 42 will become communication performed within the apparatus.

For example, the MME 30 may be achieved by using a computer configuration, which is implemented by having a CPU and a memory, and configured to cause a CPU (processor) to execute a program.

Figure 20:
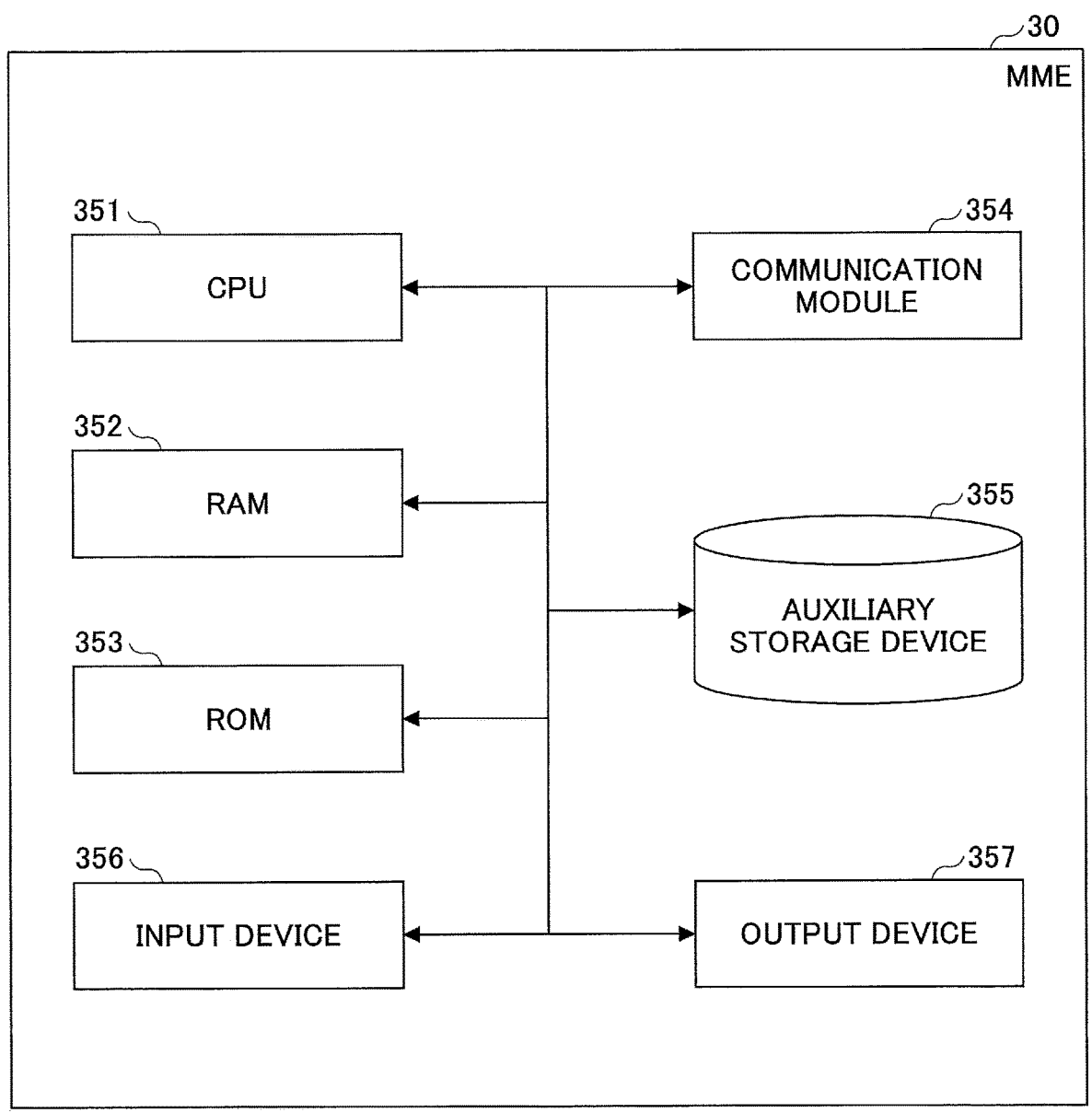
FIG. 20 is a HW configuration diagram of one or more embodiments of the MME 30.

FIG. 20 illustrates an example of a hardware (HW) configuration of the MME 30 in a case where the MME 30 is composed of a computer as described above.

As illustrated in FIG. 20, the MME 30 includes a CPU 351, a Random Access Memory (RAM) 352, a Read Only Memory (ROM) 353, a communication module 354 for performing communication, an auxiliary storage device 355 such as a hard disk, an input device 356, and an output device 357.

The CPU 351 reads programs stored in a storage unit such as a RAM 352, a ROM 353, an auxiliary storage device 355 and the like and executes the read programs so thereby execute operations of respective functions of the MME 30. Further, the communication module 354 is used for performing a communication process. Further, setting information to the MME 30 may be input by the input device 356, and an operating status of the MME 30 may be output by the output device 357.

The following illustrates a configuration example of each of the UE 50 and the eNB 10 according to one or more embodiments of the present invention.

<User Apparatus UE>

Figure 21:
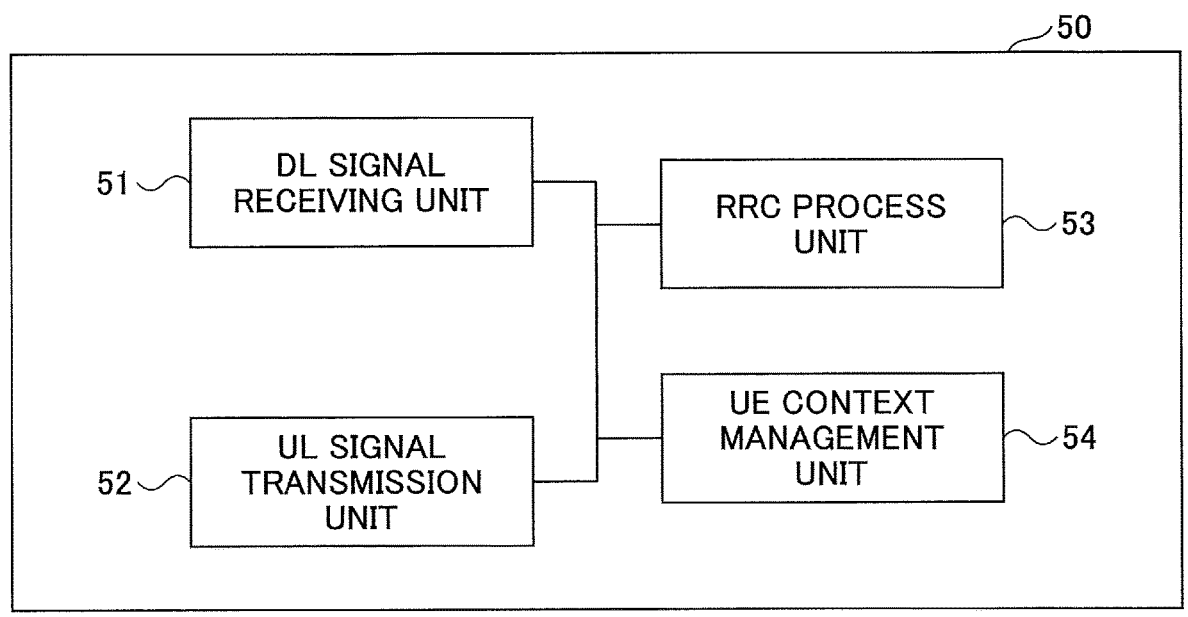
FIG. 21 is a configuration diagram of one or more embodiments of an UE 50.

FIG. 21 illustrates a functional configuration diagram of a user apparatus (UE 50). As illustrated in FIG. 21, the UE 50 includes a DL signal receiving unit 51, a Uplink (UL) signal transmission unit 52, an RRC process unit 53, and a UE context management unit 54. Note that FIG. 21 merely illustrates a functional configuration particularly related to one or more embodiments of the present invention in the UE 50, and the UE 50 may also include not-illustrated functions for performing, at the least, operations in compliance with LTE.

The Downlink (DL) signal receiving unit 51 includes a function to receive various downlink signals from the base station eNB and acquire information of a higher layer from signals of the received physical layer, and the UL signal transmission unit 52 includes a function to generate various signals of the physical layer from the information of the higher layer to be transmitted from the UE 50 and transmit the generated various signals of the physical layer to the base station eNB. Also, for example, the UE 50 is a user apparatus UE for NB-IoT, the UL signal transmission unit 52 transmits UE capability information of the user apparatus to the base station eNB. For example, the UE capability information includes a UE category for NB-IOT, but does not include a parameter of FGI and a parameter of a measurement gap.

The RRC process unit 53 performs the UE-side processes, generation/transmission (transmission performed via the UL signal transmission unit 52) of an RRC message (UE capability, etc.) described above with reference to FIGS. 4 to 5, 8, 13 to 18, etc., translation of the RRC message received via the DL signal receiving unit 51, process operations based on the translation, and the like. The RRC process unit 53 also includes a function to resume RRC connection using the UE context retained in the UE context management unit 54.

The UE context management unit 54 includes a storage unit such as a memory to store the UE context and the UE identifier (S-TMSI, etc.,) in the RRC suspended state/RRC idle state, for example, based on the instruction described in step S107 in FIG. 4, FIG. 15, etc.). Further, in the procedure illustrated in FIG. 14, the UE context management unit 54 determines whether the UE context is retained, and when the UE context management unit 54 determines that the UE context has been retained, the UE context management unit 54 instructs the RRC process unit 53 to report information indicating that the UE context has been retained.

The functional configuration of the UE 50 illustrated in FIG. 21 may be entirely implemented by one, or two or more hardware circuits (for example, one IC chip or multiple IC chips). Alternatively, a part of functional configuration of the UE 50 may be formed by hardware circuits, and the remaining part may be implemented by a CPU and a program.

Figure 22:
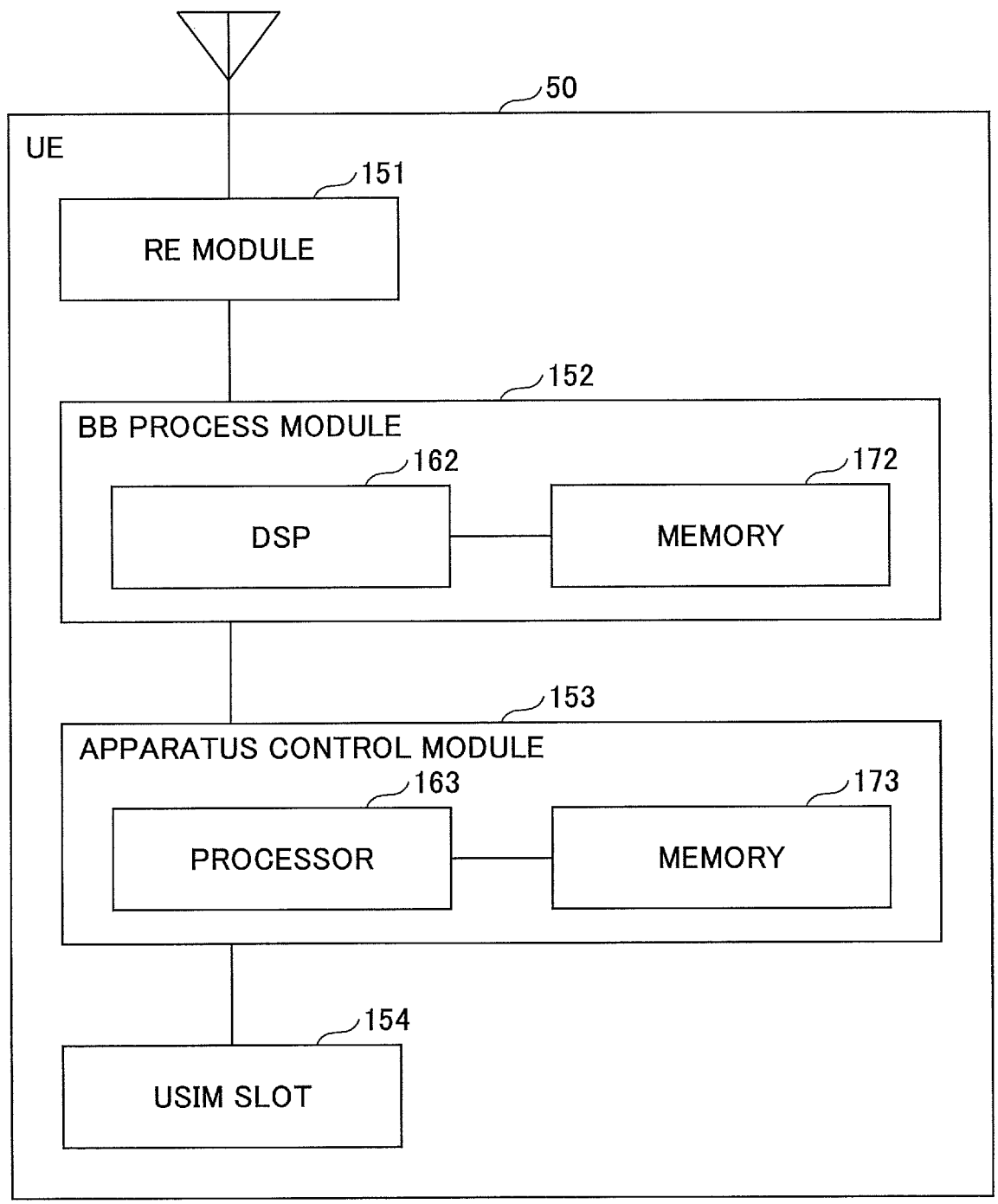
FIG. 22 is a HW configuration diagram of one or more embodiments of the UE 50.

FIG. 22 is a diagram illustrating an example of a hardware (HW) configuration of the UE 50. FIG. 22 illustrates a configuration that is closer to an implemented example than FIG. 21. As illustrated in FIG. 22, the user apparatus UE includes an Radio Equipment (RE) module 151 configured to perform a process relating to radio signals, a Base Band (BB) process module 152 configured to perform a baseband signal process, an apparatus control module 153 configured to perform a process of a higher layer, etc., and a Universal Subscriber Identity Module (USIM) slot 154 serving as an interface for accessing a USIM card.

The RE module 151 performs Digital-to-Analog (D/A) conversion, modulation, frequency conversion, power amplification, etc., on a digital baseband signal received from the BB process module 152 to generate a radio signal to be transmitted from an antenna. The RE module 151 also performs frequency conversion, Analog-to-Digital (A/D) conversion, demodulation, etc., on the received radio signal to generate a digital baseband signal to transfer the generated digital baseband signal to the BB process module 152. The RE module 151 includes functions such as physical layers in the DL signal receiving unit 51 and the UL signal transmission unit 52 in FIG. 21, for example.

The BB process module 152 is configured to perform a process of mutually converting an IP packet and a digital baseband signal. A Digital Signal Processor (DSP) 162 is a processor configured to perform a signal process in the BB process module 152. The memory 172 is used as a work area of the DSP 162. The BB process module 152 includes, for example, functions such as a layer 2 and the like in the DL signal receiving unit 51 and the UL signal transmission unit 52 in FIG. 21, an RRC process unit 53, and a UE context management unit 54. Note that all or part of the functions of the RRC process unit 53 and the UE context management unit 54 may be included in the apparatus control module 153.

The apparatus control module 153 is configured to perform an IP layer protocol process, various types of application processes, and the like. The processor 163 is configured to perform processes performed by the apparatus control module 153. The memory 173 is used as a work area of the processor 163. The processor 163 reads data from and writes data into the USIM via the USIM slot 154.

<Base Station eNB>

Figure 23:
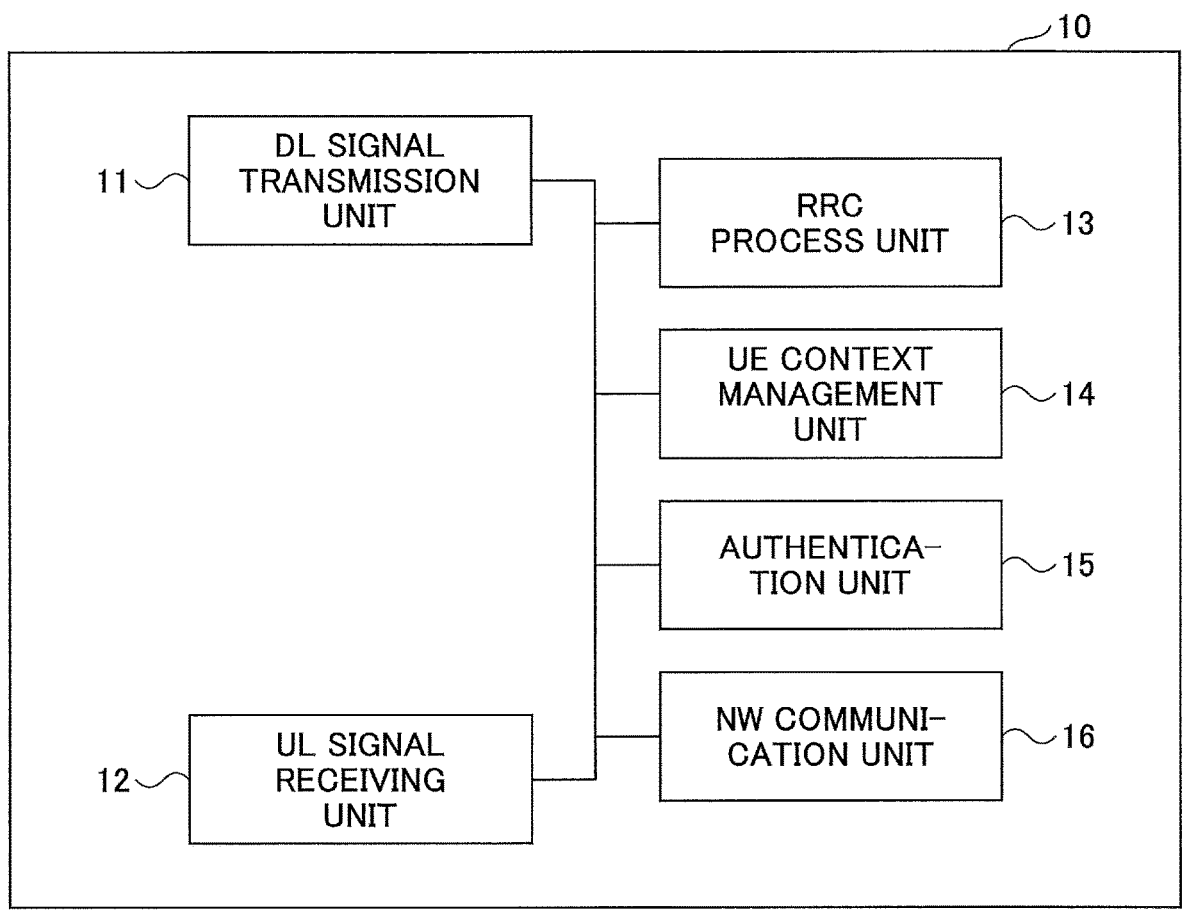
FIG. 23 is a configuration diagram of one or more embodiments of an eNB 10.

FIG. 23 illustrates a functional configuration diagram of a base station (eNB 10). As illustrated in FIG. 23, the eNB 10 includes a DL signal transmission unit 11, a UL signal receiving unit 12, an RRC process unit 13, a UE context management unit 14, an authentication unit 15 and a NW communication unit 16. Note that FIG. 23 merely illustrates the functional configuration particularly related to one or more embodiments of the present invention in the eNB 10, and the eNB 10 may also include not-illustrated functions for performing, at the least, operations in compliance with an LTE scheme.

The DL signal transmission unit 11 includes a function to generate various types of signals of the physical layer based on information of higher layers to be transmitted from the eNB 10 and transmit the generated signals. The UL signal receiving unit 12 includes a function to receive various radio signals from the user apparatus UE and acquire signals of a higher layer from the received signals of the physical layer. The UL signal receiving unit 12 includes a function to receive various uplink signals from the user apparatus UE and acquire information of higher layers based on the signals of the received physical layer.

The RRC process unit 13 performs the eNB-side processes, generation/transmission (transmission performed via the DL signal transmission unit 11) of an RRC message described above with reference to FIGS. 4 to 5, 8, 13 to 18, etc., translation of the RRC message received via the UL signal receiving unit 12, process operations based on the translation, and the like.

The UE context management unit 14 includes a storage unit such as a memory to store the UE context and the UE identifier (S-TMSI, etc.,) in the RRC suspended state/RRC idle state, for example, based on the instruction described in step S107 in FIG. 4, FIG. 14, etc.). In addition, the UE context management unit 14 includes a function to delete the UE capability when the UE 50 transitions to the RRC suspended state/RRC idle state. The UE context management unit 14 may determine whether a target UE capability is UE capability of which the size is reduced, and may determine not to delete the UE capability when the target UE capability is the UE capability of which the size is reduced. The UE context management unit 14 also has a function to store the UE capability acquired from the MME 30 in the storage unit in step S165 of FIG. 5, step S414 of FIG. 13, and the like.

The authentication unit 15 includes a function to receive authentication information from the UE and authenticating the UE in steps 501, 503 and the like illustrated in FIG. 14.

The NW communication unit 16 has a function to transmit and receive control signals with the MME via an S1-MME interface, a function to transmit and receive data while the S-GW via an S1-U interface, a function to transmit a connection maintaining command signal, a function to transmit RRC connection establishment completion, and the like. That is, the NW communication unit 16 has a function to request the MME 30 to transmit the UE capability in step S162 of FIG. 5 and step S411 of FIG. 13, and a function to receive the UE capability from the MME 30 in step S165 of FIG. 5 and step S414 of FIG. 13.

The functional configuration of the eNB 10 illustrated in FIG. 23 may be entirely implemented by one, or two or more hardware circuits (for example, one IC chip or multiple IC chips). Alternatively, a part of functional configuration of the eNB 10 may be formed by hardware circuits, and the remaining part may be implemented by a CPU and a program.

Figure 24:
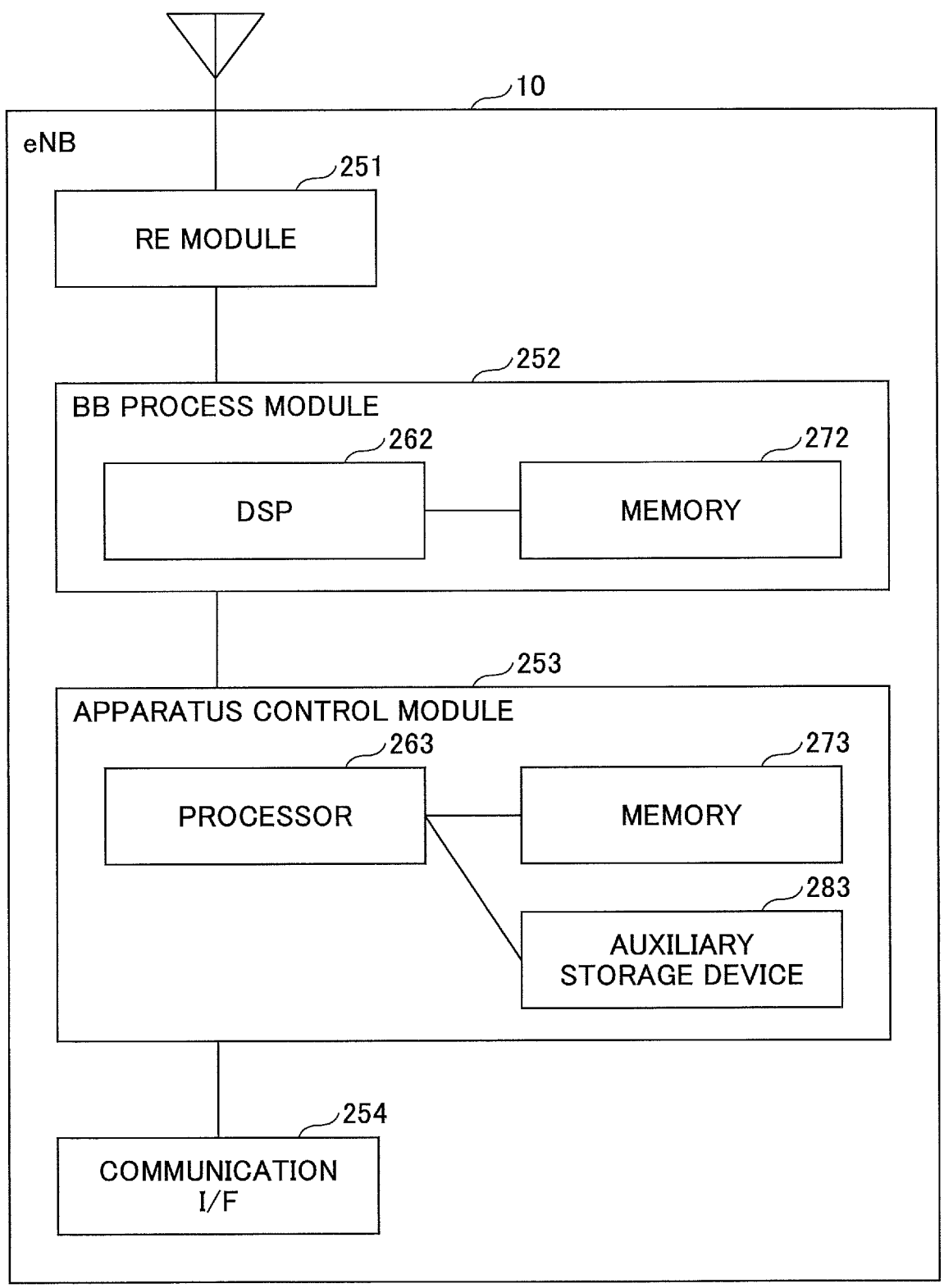
FIG. 24 is a Hardware (HW) configuration diagram of one or more embodiments of the eNB 10.

FIG. 24 is a diagram illustrating an example of a hardware (HW) configuration of the eNB 10. FIG. 24 illustrates a configuration that is closer to an implemented example than FIG. 23. As illustrated in FIG. 24, the eNB 10 includes an RE module 251 configured to perform a process relating to radio signals, a BB process module 252 configured to perform a baseband signal process, an apparatus control module 253 configured to perform a process of a higher layer and the like, and a communication IF 254 serving as an interface for connecting to a network.

The RE module 251 performs D/A conversion, modulation, frequency conversion, power amplification, etc., on the digital baseband signal received from the BB process module 252 to generate a radio signal to be transmitted from an antenna. The RE module 251 also performs frequency conversion, A/D conversion, demodulation, etc., on the received radio signal to generate a digital baseband signal to transfer the generated digital baseband signal to the BB process module 252. The RE module 251 includes functions such as physical layers in the DL signal transmission unit 11 and the UL signal receiving unit 12 in FIG. 23, for example.

The BB process module 252 is configured to perform a process of mutually converting an IP packet and a digital baseband signal. A Digital Signal Processor (DSP) 262 is a processor configured to perform a signal process in the BB process module 252. The memory 272 is used as a work area of the DSP 252. The BB process module 252 includes, for example, functions such as a layer 2 and the like in the DL signal transmission unit 11 and the UL signal receiving unit 12 in FIG. 23, an RRC process unit 13, a UE context management unit 14, and an authentication unit 15. Note that all or part of the functions of the RRC process unit 13, the UE context management unit 14, and the authentication unit 15 may be included in the apparatus control module 253.

The apparatus control module 253 is configured to perform an IP layer protocol process, OAM processes, and the like. The processor 263 is configured to perform processes performed by the apparatus control module 253. The memory 273 is used as a work area of the processor 263. An auxiliary storage device 283 may, for example, be an HDD or the like, and is configured to store various configuration information and the like for the base station eNB itself to operate.

Further, the apparatus control module 253 includes a function to process signals transmitted and received by the NW communication unit 16 in FIG. 23. The communication IF 254 corresponds to a signal transmission/reception function in the NW communication unit 16 in FIG. 23.

Note that the configuration (functional classification) of the apparatus illustrated in FIGS. 19 to 24 is merely an example of a configuration for implementing the processes described in the embodiments of the present invention (including the first embodiment, second embodiment, and UE capability size reduction). The implementation method (arrangement of specific functional parts, name, etc.,) is not restricted to a specific implementation method insofar as the processes described in the embodiments of the present invention may be implemented.

Outline of Embodiments

As described above, an aspect of the present invention may provide: a base station in a mobile communication system that supports a function to reuse context information retained in each of a user apparatus and a base station to establish a connection, the base station includes a deletion unit configured to delete predetermined information in the context information associated with the user apparatus when the user apparatus ends a connected state in a condition where the base station retains the context information associated with the user apparatus; and an acquisition unit configured to acquire the predetermined information from a communication control device that retains the predetermined information in the mobile communication system when the user apparatus restarts the connected state.

According to the above-described configuration, it is possible to reduce a size of the context information retained by the base station in the mobile communication system that supports a function to reuse context information retained in each of the user apparatus and the base station to establish a connection between the user apparatus and the base station. The UE context management unit 14 of the eNB 10 is an example of a deletion unit. The NW communication unit 16 of the eNB 10 is an example of an acquisition unit.

The acquisition unit may transmit a signal indicating resuming of the connected state to the communication control device and receive a response signal including the predetermined information from the communication control device. In a scheme for transmitting and receiving signals as illustrated in FIG. 5, the acquiring of the predetermined information in this manner enables the present invention to be efficiently applied without adding a new signal.

The signal indicating resuming of the connected state may include an identifier of the user apparatus, and the communication control device may extract the predetermined information based on the identifier of the user apparatus. Such a configuration enables the communication control device to accurately extract intended information.

The base station may further include a transmission unit configured to transmit the predetermined information to the communication control device when the user apparatus ends the connected state. Such a configuration enables the communication control device to acquire the predetermined information at the resuming of the connected state even when the communication control device fails to retain the predetermined information for some reason.

The predetermined information may, for example, be capability information of the user apparatus. Since the size of the capability information is large, such a configuration enables efficient reduction of the size of the context information to be retained by the base station.

When the predetermined information is capability information with reduced size, the deletion unit may be configured not to delete the capability information, and the acquisition unit may be configured not to acquire the capability information. Such a configuration enables reduction of the size of the context information to be retained by the base station together with reduction of the signaling sequence.

The reduced capability information may be, for example, capability information generated so as not to include information on capabilities provided by default in the user apparatus. Such a configuration enables reduction of the size of capability information by avoiding reporting of unnecessary information.

Note that each "unit" in the configuration of each of the above apparatuses may be replaced with a "part", a "circuit", a "device", or the like.

Also, according to embodiments of the present embodiment, there is provided a user apparatus in a mobile communication system including a base station and a user apparatus for NB-IoT, comprising: a receiving unit configured to receive a UE capability request from the base station; and a transmission unit configured to transmit, to the base station, UE capability information of the user apparatus according to reception of the UE capability request, wherein the UE capability information includes a UE category for NB-IOT, but does not include a parameter of FGI and a parameter of a measurement gap.

The embodiments have been described as described above; however, the disclosed invention is not limited to these embodiments, and a person skilled in the art would understand various variations, modifications, replacements, or the like. Specific examples of numerical values have been used for encouraging understanding of the present invention; however, these numeric values are merely examples and, unless otherwise noted, any appropriate values may be used. In the above description, partitioning of items is not essential to the present invention. Provisions described in more than two items may be combined if necessary. Provisions described in one item may be applied to provisions described in another item (as long as they do not conflict). In a functional block diagram, boundaries of functional units or processing units do not necessarily correspond to physical boundaries of parts. Operations of multiple functional units may be physically performed in a single part, or operations of a single functional unit may be physically performed by multiple parts. For the sake of convenience, the apparatuses have been described by using functional block diagrams. These apparatuses may be implemented by hardware, by software, or by combination of both. The software which is executed by a processor included in each of the apparatuses according to embodiments may be stored in a random access memory (RAM), a flash memory, a read-only memory (ROM), an EPROM, an EEPROM, a register, a hard disk drive (HDD), a removable disk, a CD-ROM, a database, a server, or any other appropriate recording medium.

Supplement of Embodiment

A notification of information is not limited to the aspect or embodiment described in this specification and may be given by any other method. For example, the notification of information may be given by physical layer signaling (for example, downlink control information (DCI) or uplink control information (UCI)), higher layer signaling (for example, RRC signaling, MAC signaling, broadcast information (master information block (MIB), system information block (SIB))), other signals, or a combination thereof. Further, the RRC message may be referred to as "RRC signaling." Further, the RRC message may be, for example, an RRC connection setup message, an RRC connection reconfiguration message, or the like.

Each aspect and embodiment of the present invention may be applied to LTE, LTE-A, SUPER 3G, IMT-advanced, 4G, 5G, Future Radio Access (FRA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), a system using any other appropriate system, and/or next generation systems extended on the basis of these standards.

The determination may be performed in accordance with a value (0 or 1) indicated by one bit, may be performed in accordance with a Boolean value (true or false), or may be performed by a comparison of numerical values (for example, a comparison with a predetermined value).

The terms described in this specification and/or terms necessary for understanding this specification may be replaced with terms having the same or similar meanings. For example, a channel and/or a symbol may be a signal. Further, a signal may be a message.

The mobile station UE may be a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, it may also be referred to as a remote terminal, handset, user agent, mobile client, client, or some other suitable term.

Each aspect/embodiment described in this specification may be used alone, in combination, or may be switched in accordance with the execution. Further, notification of predetermined information (for example, notification of "being X") is not limited to being performed explicitly, but is performed by implicit (for example, not notifying the predetermined information).

The terms "determining" and "deciding" used in this specification may include a wide variety of actions. For example, "determining" and "deciding" may include, for example, events in which events such as calculating, calculating, computing, processing, deriving, investigating, looking up (for example, looking up in a table, a database, or another data structure), or ascertaining are regarded as "determining" or "deciding." Further, "determining" and "deciding" may include, for example, events in which events such as receiving (for example, receiving information), transmitting (for example, transmitting information), input, output, or accessing (for example, accessing data in a memory) are regarded as "determining" or "deciding." Further, "determining" and "deciding" may include, for example, events in which events such as resolving, selecting, choosing, establishing, or comparing are regarded as "determining" or "deciding." In other words, "determining" and "deciding" may include events in which a certain operation is regarded as "determining" or "deciding."

A phrase "on the basis of" used in this specification is not limited to "on the basis of only" unless otherwise stated. In other words, a phrase "on the basis of" means both "on the basis of only" and "on the basis of at least."

The processing procedures, the sequences, and the like of the respective aspects/embodiments described in this specification may be reversed in order unless there is a contradiction. For example, the method described in this specification presents elements of various steps in an exemplary order and is not limited to a presented specific order.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

Notification of predetermined information (for example, notification of "being X") is not limited to being performed explicitly, but is performed by implicit (for example, not notifying the predetermined information).

Information, signals, and the like described in this specification may be indicated using any one of a variety of different techniques. For example, data, instructions, commands, information, signals, bits, symbols, chips, and the like which are mentioned throughout the above description may be indicated by voltages, currents, electromagnetic waves, magnetic field or magnetic particles, optical fields or photons, or an arbitrary combination thereof.

The present invention is not limited to the above embodiments, and various modified examples, revised examples, alternative examples, substitution examples, and the like are included in the present invention without departing from the spirit of the present invention.

DESCRIPTION OF REFERENCE SIGNS

10, 20 eNB
11 DL signal transmission unit
12 UL signal receiving unit
13 RRC process unit
14 UE context management unit
15 authentication unit
16 NW communication unit
30 MME
31 eNB communication unit
32 SGW communication unit
33 communication control unit
34 UE context management unit
35 S-GW
41 eNB communication unit
42 MME communication unit
43 NW communication unit
44 communication control unit
50 UE
51 DL signal receiving unit
52 UL signal transmission unit
53 RRC process unit
54 UE context management unit
151 RE module
152 BB process module
153 apparatus control module
154 USIM slot
251 RE module
252 BB process module
253 apparatus control module
254 communication IF
351 CPU
352 RAM
353 ROM
354 communication module
355 auxiliary storage device
356 input device
357 output device

The invention claimed is:

1. A user apparatus in a mobile communication system including a base station and a user apparatus for Narrow Band Internet of Things (NB-IoT), comprising:
   a receiver that receives a UE capability request from the base station; and
   a transmitter that transmits, to the base station, UE capability information of the user apparatus according to reception of the UE capability request,
   wherein the UE capability information includes a UE category for NB-IOT and a packet data convergence protocol (PDCP) parameter including a supported Robust Header Compression (ROHC) profile, but does not include a parameter of Feature Group Indicators (FGI) and a parameter of a measurement gap,
   wherein the UE capability information is transmitted via an information element for narrow band, and
   wherein the information element comprises accessStratumRelease.

* * * * *